United States Patent
Schuehmacher et al.

(10) Patent No.: US 10,774,774 B2
(45) Date of Patent: Sep. 15, 2020

(54) INTERNAL COMBUSTION ENGINE HAVING TWO FUEL INJECTORS PER CYLINDER AND CONTROL METHOD THEREFOR

(71) Applicant: BOMBARDIER RECREATIONAL PRODUCTS INC., Valcourt (CA)

(72) Inventors: Bruno Schuehmacher, Richmond (CA); Luc Champigny, Racine (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/416,159

(22) Filed: May 18, 2019

(65) Prior Publication Data
US 2019/0271280 A1  Sep. 5, 2019

Related U.S. Application Data

(60) Division of application No. 16/222,968, filed on Dec. 17, 2018, now Pat. No. 10,519,893, which is a (Continued)

(51) Int. Cl.
*F02D 41/30* (2006.01)
*F02B 75/02* (2006.01)
(Continued)

(52) U.S. Cl.
CPC .......... *F02D 41/3094* (2013.01); *F02B 61/00* (2013.01); *F02B 75/02* (2013.01);
(Continued)

(58) Field of Classification Search
CPC .. F02D 41/10; F02D 41/1498; F02D 41/3094; F02D 41/021; F02D 41/1446;
(Continued)

(56) References Cited

U.S. PATENT DOCUMENTS 4,779,581 A   10/1988  Maier
5,092,287 A    3/1992  Motoyama et al.
(Continued)

FOREIGN PATENT DOCUMENTS

EP   1555418 A1   7/2005
JP   3047594 B2   5/2000
(Continued)

OTHER PUBLICATIONS

International Search Report of PCT/IB2016/053184; Blaine R. Copenheaver; dated Dec. 8, 2016.
(Continued)

*Primary Examiner* — George C Jin
(74) *Attorney, Agent, or Firm* — BCF LLP

(57) ABSTRACT

A method for controlling a two-stroke internal combustion engine is disclosed. The engine has at least one combustion chamber, at least one direct fuel injector for injecting fuel directly in the at least one combustion chamber, at least one port fuel injector for injecting fuel upstream of the at least one combustion chamber, and at least one exhaust valve. The method has the steps of supplying a first fuel quantity to the at least one combustion chamber, a first ratio of the first fuel quantity being supplied by the at least one port fuel injector; and supplying a second fuel quantity to the at least one combustion chamber when a position of the at least one exhaust valve changes, a second ratio of the second fuel quantity being supplied by the at least one port fuel injector, the second ratio being different from the first ratio.

10 Claims, 13 Drawing Sheets

Related U.S. Application Data continuation of application No. 15/439,258, filed on Feb. 22, 2017, now Pat. No. 10,190,524, which is a continuation-in-part of application No. PCT/IB2016/053184, filed on May 30, 2016.

(60) Provisional application No. 62/298,053, filed on Feb. 22, 2016, provisional application No. 62/167,959, filed on May 29, 2015.

(51) Int. Cl.
| | |
|---|---|
| *F02D 41/04* | (2006.01) |
| *F02B 61/00* | (2006.01) |
| *F02D 41/02* | (2006.01) |
| *F02D 41/14* | (2006.01) |
| *F02M 69/04* | (2006.01) |

(52) U.S. Cl.
CPC ......... *F02D 41/021* (2013.01); *F02D 41/047* (2013.01); *F02D 41/1446* (2013.01); *F02B 2075/025* (2013.01); *F02D 2200/021* (2013.01); *F02D 2200/602* (2013.01); *F02D 2200/703* (2013.01); *F02D 2400/04* (2013.01); *F02M 69/046* (2013.01)

(58) Field of Classification Search
CPC .. F02D 41/047; F02D 41/086; F02D 41/3845; F02D 41/401; F02D 39/04; F02D 2200/021; F02D 17/02; F02D 19/0631; F02D 19/081; F02D 19/12; F02D 19/061; F02D 19/0692; F02D 19/0694; F02B 61/00; F02B 75/02; F02B 2270/13; F02B 17/045; F02B 2700/03; F02B 2710/0323; F02M 69/046
See application file for complete search history.

(56) References Cited

U.S. PATENT DOCUMENTS

| | | | |
|---|---|---|---|
| 5,241,939 A | 9/1993 | Nonaka | |
| 5,474,052 A | 12/1995 | Aquino et al. | |
| 6,539,900 B2 | 4/2003 | Laimbock | |
| 6,578,547 B2 | 6/2003 | Piock | |
| 6,928,983 B2 | 8/2005 | Mashiki | |
| 6,973,910 B2 | 12/2005 | Ohtani | |
| 7,013,872 B2 | 3/2006 | Yamazaki et al. | |
| 7,051,713 B2 | 5/2006 | Mashiki | |
| 7,082,926 B2 | 8/2006 | Sadakane et al. | |
| 7,082,927 B2 | 8/2006 | Miyashita | |
| 7,089,892 B1 | 8/2006 | Hosaluk et al. | |
| 7,134,420 B2 | 11/2006 | Miyashita | |
| 7,150,265 B2 | 12/2006 | Shibagaki | |
| 7,168,401 B2 | 1/2007 | Johnson | |
| 7,207,315 B2 | 4/2007 | Maruyama | |
| 7,278,397 B2 | 10/2007 | Kobayashi | |
| 7,296,558 B2 | 11/2007 | Saeki et al. | |
| 7,334,569 B2 | 2/2008 | Kobayashi | |
| 7,424,881 B2 | 9/2008 | Kerns | |
| 7,448,981 B2 | 11/2008 | Mashiki | |
| 7,574,299 B2 | 8/2009 | Shinohara et al. | |
| 7,640,912 B2 | 1/2010 | Lewis et al. | |
| 7,640,914 B2 | 1/2010 | Lewis et al. | |
| 7,647,916 B2 | 1/2010 | Leone et al. | |
| 7,694,666 B2 | 4/2010 | Lewis et al. | |
| 7,707,988 B2 | 5/2010 | Irisawa | |
| 7,721,709 B2 | 5/2010 | Shinohara et al. | |
| 8,146,568 B2 | 4/2012 | Cohn et al. | |
| 8,170,778 B2 | 5/2012 | Ando et al. | |
| 8,342,158 B2 | 1/2013 | Ulrey et al. | |
| 8,567,370 B2 | 10/2013 | Bidner et al. | |
| 2005/0066939 A1 | 3/2005 | Shimada et al. | |
| 2005/0155569 A1 | 7/2005 | Pien | |
| 2005/0155578 A1 | 7/2005 | Ichise et al. | |
| 2005/0166896 A1 | 8/2005 | Sadakane et al. | |
| 2006/0090716 A1 | 5/2006 | Glassburn | |
| 2006/0185632 A1 | 8/2006 | Mavinahally | |
| 2006/0207560 A1 | 9/2006 | Kobayashi | |
| 2006/0272599 A1 | 12/2006 | Johnson | |
| 2007/0215112 A1 | 9/2007 | Brehob et al. | |
| 2010/0222988 A1 | 9/2010 | Thomas | |
| 2012/0065867 A1 | 3/2012 | Dobeck et al. | |
| 2014/0014069 A1 | 1/2014 | Yarino et al. | |
| 2014/0216426 A1* | 8/2014 | Saito .................. | F01M 1/14 123/65 P |
| 2014/0261301 A1 | 9/2014 | Leone | |
| 2016/0160791 A1 | 6/2016 | Fritz et al. | |
| 2017/0159598 A1 | 6/2017 | Schuehmacher et al. | |
| 2017/0204778 A1 | 7/2017 | Yamada et al. | |

FOREIGN PATENT DOCUMENTS

| | | |
|---|---|---|
| JP | 2006258049 A | 9/2006 |
| JP | 2010144573 A | 7/2010 |
| WO | 2006079172 A1 | 8/2006 |
| WO | 2014049405 A1 | 4/2014 |
| WO | 2014068378 A2 | 5/2014 |

OTHER PUBLICATIONS

X-Tau Transient Fuel Compensation; MEGAMEET 2009; Atlanta; BG Soflex LLC; retrieved from https://www.diyautotune.com/wp-content/uploads/megameet2009_xtau.ppt. on Feb. 22, 2017.

2015 KX/KLX models Brochure; 2014; Kawasaki Motors Corp.; USA.

Motocross Action Magazine; Ten Things You Need to Know About Dual-Fuel Injection; retrieved from http://motocrossactionmag.com/news/10-things-you-need-to-know-about-dual-fuel-injection on Feb. 22, 2017.

Ikoma, T. et al.; Development of V-6 3.5-liter Engine Adopting New Direct Injection System; Toyota Motor Corporation, Yamaha Motor Co. Ltd. and Nippon Soken Inc.; SAE International; 2006; 2006 SAE World Congress; Michigan; USA.

Aquino C. F.; Transient A/F Control Characteristics of the 5 Liter Central Fuel Injection Engine; Ford Motor Co.; Society of Automotive Engineers, INC.; 1981; International Congress and Exposition; Michigan; USA.

English translation of JP3047594B2 received from the EPO with the Supplementary European Searh Report issued in connection with European Patent Application No. 16802667.2.

English translation of JP2010144573A received from the EPO with the Supplementary European Searh Report issued in connection with European Patent Application No. 16802667.2.

Machine translation of JP2006258049A retrieved from http://translationportal.epo.org/ on Nov. 23, 2018.

Supplementary Search Report issued by the EPO in connection with European Patent Application No. 16802667.2; dated Nov. 22, 2018.

* cited by examiner

FIG. 8A

FUEL RATIO

| THROTTLE POSITION (%) | ENGINE SPEED (RPM) | | | | | | | | | | | | |
|---|---|---|---|---|---|---|---|---|---|---|---|---|---|
| | 500 | 1000 | 1500 | 2000 | 3000 | 4000 | 5000 | 6000 | 7000 | 8000 | 9000 |
| 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 |
| 10 | 0 | 0 | 0 | 55 | 0 | 0 | 0 | 0 | 0 | 80 | 85 |
| 15 | 0 | 55 | 55 | 55 | 55 | 0 | 0 | 0 | 0 | 80 | 85 |
| 20 | 0 | 55 | 55 | 55 | 55 | 55 | 0 | 0 | 0 | 80 | 85 |
| 25 | 0 | 55 | 55 | 55 | 55 | 55 | 50 | 45 | 45 | 65 | 65 |
| 30 | 0 | 55 | 55 | 55 | 55 | 55 | 55 | 55 | 45 | 65 | 65 |
| 35 | 0 | 55 | 55 | 55 | 55 | 55 | 55 | 55 | 45 | 50 | 50 |
| 40 | 0 | 55 | 55 | 55 | 55 | 55 | 55 | 55 | 45 | 45 | 45 |
| 45 | 0 | 55 | 55 | 55 | 55 | 55 | 55 | 55 | 40 | 40 | 45 |
| 50 | 0 | 55 | 55 | 55 | 55 | 55 | 55 | 55 | 35 | 40 | 40 |
| 55 | 0 | 55 | 55 | 55 | 55 | 55 | 55 | 55 | 35 | 35 | 35 |
| 60 | 0 | 55 | 55 | 55 | 55 | 55 | 55 | 55 | 35 | 35 | 35 |
| 65 | 0 | 55 | 55 | 55 | 55 | 55 | 55 | 55 | 35 | 35 | 35 |
| 70 | 0 | 55 | 55 | 55 | 55 | 55 | 55 | 55 | 35 | 35 | 35 |
| 75 | 0 | 55 | 55 | 55 | 55 | 55 | 55 | 55 | 35 | 35 | 35 |
| 80 | 0 | 55 | 55 | 55 | 55 | 55 | 55 | 55 | 35 | 35 | 35 |
| 85 | 0 | 55 | 55 | 55 | 55 | 55 | 55 | 55 | 35 | 35 | 35 |
| 90 | 0 | 55 | 55 | 55 | 55 | 55 | 55 | 55 | 35 | 35 | 35 |
| 95 | 0 | 55 | 55 | 55 | 55 | 55 | 55 | 55 | 35 | 35 | 35 |
| 100 | 0 | 55 | 55 | 55 | 55 | 55 | 55 | 55 | 35 | 35 | 35 |

EXHAUST VALVES POSITION

| THROTTLE POSITION (%) \ ENGINE SPEED (RPM) | 500 | 1000 | 1500 | 2000 | 3000 | 4000 | 5000 | 6000 | 7000 | 8000 | 9000 |
|---|---|---|---|---|---|---|---|---|---|---|---|
| 0 | FL | FL | FL | FL | FL | FL | FL | FL | FL | FL | FL |
| 5 | FL | FL | FL | FL | FL | FL | FL | FL | I1 | I1 | I1 |
| 10 | FL | FL | FL | FL | FL | FL | FL | FL | I1 | I1 | I1 |
| 15 | FL | FL | FL | FL | FL | FL | FL | I1 | I1 | I1 | I1 |
| 20 | FL | FL | FL | FL | FL | FL | FL | I1 | I1 | I1 | I1 |
| 25 | FL | FL | FL | FL | FL | FL | I1 | I1 | I1 | I1 | I1 |
| 30 | FL | FL | FL | FL | FL | FL | I1 | I1 | I2 | I2 | FO |
| 35 | FL | FL | FL | FL | FL | FL | I1 | FO | FO | FO | FO |
| 40 | FL | FL | FL | FL | FL | FL | I1 | FO | FO | FO | FO |
| 45 | FL | FL | FL | FL | FL | FL | I1 | FO | FO | FO | FO |
| 50 | FL | FL | FL | FL | FL | FL | I1 | FO | FO | FO | FO |
| 55 | FL | FL | FL | FL | FL | FL | I1 | FO | FO | FO | FO |
| 60 | FL | FL | FL | FL | FL | FL | I1 | FO | FO | FO | FO |
| 65 | FL | FL | FL | FL | FL | FL | I1 | FO | FO | FO | FO |
| 70 | FL | FL | FL | FL | FL | FL | I1 | FO | FO | FO | FO |
| 75 | FL | FL | FL | FL | FL | FL | I1 | FO | FO | FO | FO |
| 80 | FL | FL | FL | FL | FL | FL | I1 | FO | FO | FO | FO |
| 85 | FL | FL | FL | FL | FL | FL | I1 | FO | FO | FO | FO |
| 90 | FL | FL | FL | FL | FL | FL | I1 | FO | FO | FO | FO |
| 95 | FL | FL | FL | FL | FL | FL | I1 | FO | FO | FO | FO |
| 100 | FL | FL | FL | FL | FL | FL | I1 | FO | FO | FO | FO |

PFI FUEL TRAPPING EFFICIENCY CORRECTION (%)

| Throttle Position (%) \ Engine Speed (RPM) | 500 | 1000 | 1500 | 2000 | 3000 | 4000 | 5000 | 6000 | 7000 | 8000 | 9000 |
|---|---|---|---|---|---|---|---|---|---|---|---|
| 0   | 100 | 100 | 100 | 100 | 100 | 100 | 100 | 100 | 100 | 100 | 100 |
| 5   | 100 | 100 | 100 | 100 | 100 | 100 | 100 | 100 | 100 | 100 | 100 |
| 10  | 100 | 155 | 155 | 155 | 155 | 155 | 155 | 135 | 125 | 125 | 125 |
| 15  | 100 | 155 | 155 | 155 | 155 | 155 | 155 | 135 | 125 | 125 | 125 |
| 20  | 100 | 155 | 155 | 155 | 155 | 155 | 155 | 135 | 125 | 125 | 125 |
| 25  | 100 | 155 | 155 | 155 | 155 | 155 | 155 | 135 | 125 | 125 | 125 |
| 30  | 100 | 155 | 155 | 155 | 155 | 155 | 155 | 135 | 125 | 125 | 125 |
| 35  | 100 | 155 | 155 | 155 | 155 | 155 | 155 | 135 | 125 | 125 | 125 |
| 40  | 100 | 155 | 155 | 155 | 155 | 155 | 155 | 135 | 125 | 125 | 125 |
| 45  | 100 | 155 | 155 | 155 | 155 | 155 | 155 | 135 | 125 | 125 | 125 |
| 50  | 100 | 155 | 155 | 155 | 155 | 155 | 155 | 135 | 125 | 125 | 125 |
| 55  | 100 | 155 | 155 | 155 | 155 | 155 | 155 | 135 | 125 | 125 | 125 |
| 60  | 100 | 155 | 155 | 155 | 155 | 155 | 155 | 135 | 125 | 125 | 125 |
| 65  | 100 | 155 | 155 | 155 | 155 | 155 | 155 | 135 | 125 | 125 | 125 |
| 70  | 100 | 155 | 155 | 155 | 155 | 155 | 155 | 135 | 125 | 125 | 125 |
| 75  | 100 | 155 | 155 | 155 | 155 | 155 | 155 | 135 | 125 | 125 | 125 |
| 80  | 100 | 145 | 145 | 145 | 145 | 145 | 145 | 135 | 125 | 125 | 125 |
| 85  | 100 | 145 | 145 | 145 | 145 | 145 | 145 | 135 | 125 | 125 | 125 |
| 90  | 100 | 145 | 145 | 145 | 145 | 145 | 145 | 135 | 125 | 125 | 125 |
| 95  | 100 | 115 | 115 | 115 | 115 | 115 | 115 | 115 | 110 | 110 | 110 |
| 100 | 100 | 100 | 100 | 100 | 100 | 100 | 100 | 100 | 100 | 100 | 100 |

INTERNAL COMBUSTION ENGINE HAVING TWO FUEL INJECTORS PER CYLINDER AND CONTROL METHOD THEREFOR

CROSS-REFERENCE

The present application is a division of U.S. patent application Ser. No. 16/222,968, filed Dec. 17, 2018, which is a continuation of U.S. patent application Ser. No. 15/439,258, filed Feb. 22, 2017, which is a continuation-in-part of International Patent Application No. PCT/IB2016/053184, filed May 30, 2016, which claims priority to U.S. Provisional Application No. 62/298,053, filed Feb. 22, 2016, and U.S. Provisional Application No. 62/167,959, filed May 29, 2015, the entirety of all of which is incorporated herein by reference.

FIELD OF TECHNOLOGY

The present technology relates to internal combustion engines having two fuel injectors per cylinder and methods for controlling such engines.

BACKGROUND

Two-stroke internal combustion engine burn a mixture of fuel and oil. Many two-stroke internal combustion engines use a carburetor to supply the mixture of fuel, oil and air to the combustion chambers of the engine. The mixture of fuel, oil and air flows from the carburetor, to the crankcase, then through scavenge ports to the combustion chambers.

Such carbureted engines have some drawbacks. They do not provide for a precise control of the fuel being supplied. They also produce a substantial amount of polluting emissions.

One of the advancements made to two-stroke internal combustion engines consists in replacing the carburetor with a throttle body and a port fuel injector that injects fuel upstream of the combustion chamber. The use of the port fuel injector allows for a more precise control of the fuel quantity being delivered and has helped reduce the amount of polluting emissions being produced.

In recent years, the port fuel injectors have been replaced in some two-stroke engines by direct fuel injectors such as the E-TEC™ fuel injector from BRP™. The direct fuel injectors inject fuel directly into the combustion chambers of the engine. As a result of the use of the direct fuel injectors, the engine performance has improved, even more precise control of the fuel quantity being injected is possible, less oil is used, and the amount of polluting emissions, such as carbon monoxide, has been reduced even more.

Although direct fuel injection has helped improved two-stroke engines, as the demand for even higher performance engines continues, the use direct fuel injectors has some drawbacks. For example, at very high engine speed (RPM), there is a very short period of time during which fuel can be injected and then mix with the air in the combustion chamber. As such, the fuel may not have the time to properly atomized, resulting in larger droplets of fuel being combusted, which emits more soot than when the fuel has properly atomized.

Although some of the above drawbacks could be resolved by switching to a four-stroke engine, doing so would result in losing the advantages typically associated with two-stroke engine, namely a simplified construction, more power (two-stroke engines have an explosion in each combustion chamber at every revolution, four-stoke engines at every two revolutions), and a lighter weight. These advantages of two-stroke engines are important features for vehicles such as motorcycles, snowmobiles and other recreational vehicles.

There is therefore a desire for a two-stroke engine having the advantages associated with direct fuel injection while addressing at least some of its drawbacks.

SUMMARY

It is an object of the present technology to ameliorate at least some of the inconveniences present in the prior art.

According to one aspect of the present technology, there is provided a method for controlling a two-stroke internal combustion engine. The engine has at least one combustion chamber, at least one direct fuel injector for injecting fuel directly in the at least one combustion chamber, and at least one port fuel injector for injecting fuel upstream of the at least one combustion chamber. The method comprises determining a first fuel quantity to be supplied to the at least one combustion chamber; determining a ratio of the first fuel quantity to be injected by the at least one direct fuel injector; determining a ratio of the first fuel quantity to be injected by the at least one port fuel injector; injecting a second fuel quantity in the at least one combustion chamber using the at least one direct fuel injector; injecting a third fuel quantity upstream of the at least one combustion chamber using the at least one port fuel injector, a sum of the second and third fuel quantities being initially greater than the first fuel quantity; and decreasing at least one of the second and third fuel quantities over time such that the sum of the second and third fuel quantities equals at least the first fuel quantity.

In some implementations of the present technology, the sum of the second and third fuel quantities is at least initially greater than the first fuel quantity when the ratio of the first fuel quantity to be injected by the at least one port fuel injector has changed from 0 percent to more than 0 percent.

In some implementations of the present technology, the first fuel quantity corresponds to a combination of a base fuel quantity and a correction factor. The base fuel quantity is determined based at least in part on engine speed and throttle position. The correction factor is determined based at least in part on at least one of atmospheric pressure, air temperature, engine temperature and exhaust temperature.

In some implementations of the present technology, the second fuel quantity is initially greater than the ratio of the first fuel quantity to be injected by the at least one direct fuel injector. The third fuel quantity is initially greater than the ratio of the first fuel quantity to be injected by the at least one port fuel injector.

In some implementations of the present technology, the second fuel quantity is initially the first fuel quantity, is held constant for a first period of time and is then decreased until the second fuel quantity equals the ratio of the first fuel quantity to be injected by the at least one direct fuel injector.

In some implementations of the present technology, following the first period of time, the second fuel quantity is held constant for a second period of time at a value between the first fuel quantity and the ratio of the first fuel quantity to be injected by the at least one direct fuel injector.

In some implementations of the present technology, following the second period of time, the second fuel quantity is reduced linearly until the second fuel quantity equals the ratio of the first fuel quantity to be injected by the at least one direct fuel injector.

In some implementations of the present technology, the third fuel quantity is initially a value between the first fuel quantity and the ratio of the first fuel quantity to be injected by the at least one port fuel injector and is then decreased until the third fuel quantity equals at least the ratio of the first fuel quantity to be injected by the at least one port fuel injector.

In some implementations of the present technology, the third fuel quantity is decreased linearly.

In some implementations of the present technology, the third fuel quantity corresponds to a combination of the ratio of the first fuel quantity to be injected by the at least one port fuel injector and at least one correction factor.

In some implementations of the present technology, the at least one correction factor includes a phase-in correction factor, the phase-in correction factor being greater than or equal to 100 percent. The third fuel quantity corresponds to the ratio of the first fuel quantity to be injected by the at least one port fuel injector multiplied by the phase-in correction factor.

In some implementations of the present technology, the at least one correction factor further includes a fuel trapping efficiency correction factor based at least in part on engine speed and throttle position, the fuel trapping efficiency correction factor being greater than 100 percent. The third fuel quantity corresponds to the ratio of the first fuel quantity to be injected by the at least one port fuel injector multiplied by the phase-in correction factor, multiplied by the fuel trapping efficiency correction factor.

In some implementations of the present technology, decreasing at least one of the second and third fuel quantities over time comprises decreasing both the second and third fuel quantities over time.

In some implementations of the present technology, the second fuel quantity is decreased faster than the third fuel quantity.

In some implementations of the present technology, the second fuel quantity is greater than the ratio of the first fuel quantity to be injected by the at least one direct fuel injector; and the third fuel quantity is equal to the ratio of the first fuel quantity to be injected by the at least one port fuel injector.

In some implementations of the present technology, the second fuel quantity is initially greater than the first fuel quantity.

In some implementations of the present technology, the second fuel quantity is then decreased until the second fuel quantity equals at least the ratio of the first fuel quantity to be injected by the at least one direct fuel injector.

In some implementations of the present technology, the engine has at least one exhaust valve movable between at least a fully lowered position and a fully opened position. When the at least one exhaust valve is in the fully opened position, the second fuel quantity to be injected by the at least one direct fuel injector is greater than 0 and the third fuel quantity to be injected by the at least one port fuel injector is greater than 0.

In some implementations of the present technology, the at least one direct fuel injector supplies fuel to produce one of a stratified charge and a homogeneous charge. When the at least one direct fuel injector supplies fuel to produce the stratified charge, the third fuel quantity to be injected by the at least one port fuel injector is 0.

According to another aspect of the present technology, there is provided a method for controlling a two-stroke internal combustion engine. The engine has at least one combustion chamber, at least one direct fuel injector for injecting fuel directly in the at least one combustion chamber, and at least one port fuel injector for injecting fuel upstream of the at least one combustion chamber. The method comprises: determining a first fuel quantity to be supplied to the at least one combustion chamber; determining a ratio of the first fuel quantity to be injected by the at least one direct fuel injector; and determining a ratio of the first fuel quantity to be injected by the at least one port fuel injector. If the ratio of the first fuel quantity to be injected by the at least one port fuel injector has changed from more than 0 percent to 0 percent: injecting a second fuel quantity in the at least one combustion chamber using the at least one direct fuel injector, the second fuel quantity being initially less than the first fuel quantity; stopping to inject fuel using the at least one port fuel injector; and increasing the second fuel quantity over time such that the second fuel quantity equals the first fuel quantity.

In some implementations of the present technology, the first fuel quantity corresponds to a combination of a base fuel quantity and a correction factor. The base fuel quantity is determined based at least in part on engine speed and throttle position. The correction factor is determined based at least in part on at least one of atmospheric pressure, air temperature, engine temperature and exhaust temperature.

In some implementations of the present technology, the second fuel quantity is initially held constant for a first period of time and is then increased until the second fuel quantity equals the first fuel quantity.

In some implementations of the present technology, following the first period of time, the second fuel quantity is increased linearly until the second fuel quantity equals the first fuel quantity.

According to another aspect of the present technology, there is provided a method for controlling a two-stroke internal combustion engine. The engine has at least one combustion chamber, at least one direct fuel injector for injecting fuel directly in the at least one combustion chamber, and at least one port fuel injector for injecting fuel upstream of the at least one combustion chamber. The method comprises: determining a first fuel quantity to be supplied to the at least one combustion chamber; determining a ratio of the first fuel quantity to be injected by the at least one direct fuel injector; determining a ratio of the first fuel quantity to be injected by the at least one port fuel injector; determining which of a phase-in control, a phase-out control, and a regular control is to be used, the phase-in control being used when the ratio of the first fuel quantity to be injected by the at least one port fuel injector has changed from 0 percent to more than 0 percent, the phase-out control being used when the ratio of the first fuel quantity to be injected by the at least one port fuel injector has changed from more than 0 percent to 0 percent, the regular control being used when the ratio of the first fuel quantity to be injected by the at least one port fuel injector has remained at 0 percent or has remained above 0 percent; injecting fuel using at least one of the at least one direct fuel injector and the at least one port fuel injector according to the one of the phase-in control, the phase-out control and the regular control that has been determined; when fuel is injected according to the phase-in control, determining if a condition that would result into too much fuel being supplied to the at least one combustion chamber is present; and if the condition is present, reducing a quantity of fuel being injected during phase-in control.

In some implementations of the present technology, the condition corresponds to the phase-in control having been used more than or equal to a predetermined number of times within one of a predetermined amount of time and a predetermined amount of engine cycles. The quantity of fuel being injected during the phase-in control is reduced if the phase-in control has been used more than or equal to a predetermined number of times.

In some implementations of the present technology, during phase-in control, injecting fuel comprises: injecting a second fuel quantity in the at least one combustion chamber using the at least one direct fuel injector; injecting a third fuel quantity upstream of the at least one combustion chamber using the at least one port fuel injector, a sum of the second and third fuel quantities being initially greater than the first fuel quantity; and decreasing at least one of the second and third fuel quantities over time such that the sum of the second and third fuel quantities equals a quantity of fuel to be injected during regular control for a corresponding engine speed and throttle position.

In some implementations of the present technology, decreasing at least one of the second and third fuel quantities over time comprises decreasing both the second and third fuel quantities over time.

In some implementations of the present technology, during phase-out control, injecting fuel comprises: injecting a second fuel quantity in the at least one combustion chamber using the at least one direct fuel injector, the second fuel quantity being initially less than the first fuel quantity; stopping to inject fuel using the at least one port fuel injector; and increasing the second fuel quantity over time such that the second fuel quantity equals a quantity of fuel to be injected during regular control for a corresponding engine speed and throttle position.

According to another aspect of the present technology, there is provided a two-stroke internal combustion engine having a crankcase, a cylinder block connected to the crankcase, the cylinder block defining at least one cylinder, each of the at least one cylinder defining at least one exhaust port, a cylinder head connected to the cylinder block, the cylinder block being disposed between the crankcase and the cylinder head, a crankshaft disposed at least in part in the crankcase, at least one piston disposed in the at least one cylinder, the cylinder head, the at least one cylinder and the at least one piston defining at least one combustion chamber, a least one connecting rod connecting the at least one piston to the crankshaft, at least one scavenge port fluidly communicating an interior of the crankcase with the at least one combustion chamber, at least one throttle body connected to at least one of the crankcase and the cylinder block for supplying air to the interior of the crankcase via at least one air intake port, air flowing from the at least one throttle body to the interior of the crankcase, from the interior of the crankcase to the at least one scavenge port, and from the at least one scavenge port to the at least one combustion chamber, each of the at least one throttle body having a throttle plate, at least one direct fuel injector fluidly communicating with the at least one combustion chamber for injecting fuel directly in the at least one combustion chamber, and at least one port fuel injector fluidly communicating with the interior of the crankcase for injecting fuel upstream of the at least one combustion chamber.

In some implementations of the present technology, the at least one port fuel injector injects fuel directly in one of the at least one throttle body, the interior of the crankcase and the at least one scavenge port.

In some implementations of the present technology, the at least one port fuel injector is connected to the at least one throttle body and injects fuel directly in the at least one throttle body.

In some implementations of the present technology, the at least one direct fuel injector is connected to the cylinder head.

In some implementations of the present technology, each of the at least one port fuel injector injects fuel upstream of a corresponding one of the at least one air intake port and downstream of the throttle plate of a corresponding one of the at least one throttle body.

In some implementations of the present technology, the at least one air intake port is formed in the cylinder block.

In some implementations of the present technology, the at least one cylinder is two cylinders, the at least one exhaust port is at least two exhaust ports, the at least one piston is two pistons, the at least one combustion chamber is two combustion chambers, the at least one connecting rod is two connecting rods, the at least one scavenge port is at least two scavenge ports, the at least one throttle body is two throttle bodies, the at least one air intake port is at least two air intake ports, the at least one direct fuel injector is two direct fuel injectors, and the at least one port fuel injector is two port fuel injectors.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 8A illustrates a fuel ratio map;

FIG. 8B illustrates an exhaust valves position map;

FIG. 9 illustrates a fuel trapping correction map;

DETAILED DESCRIPTION

The method for controlling an internal combustion engine will be described with respect to a snowmobile 10. However, it is contemplated that the method and system could be used in other vehicles, such as, but not limited to, on-road vehicles, off-road vehicles, a motorcycle, a scooter, a three-wheel road vehicle, a boat powered by an outboard engine or an inboard engine, and an all-terrain vehicle (ATV). It is also contemplated that the method and system could be used in devices other than vehicles that have an internal combustion engine such as a generator. The method and system will also be described with respect to a two-stroke, inline, two-cylinder internal combustion engine 24. However, it is contemplated that the method and system could be used with an internal combustion engine having more than two cylinders or having a configuration other than inline, such as a V-type engine.

Figure 1:
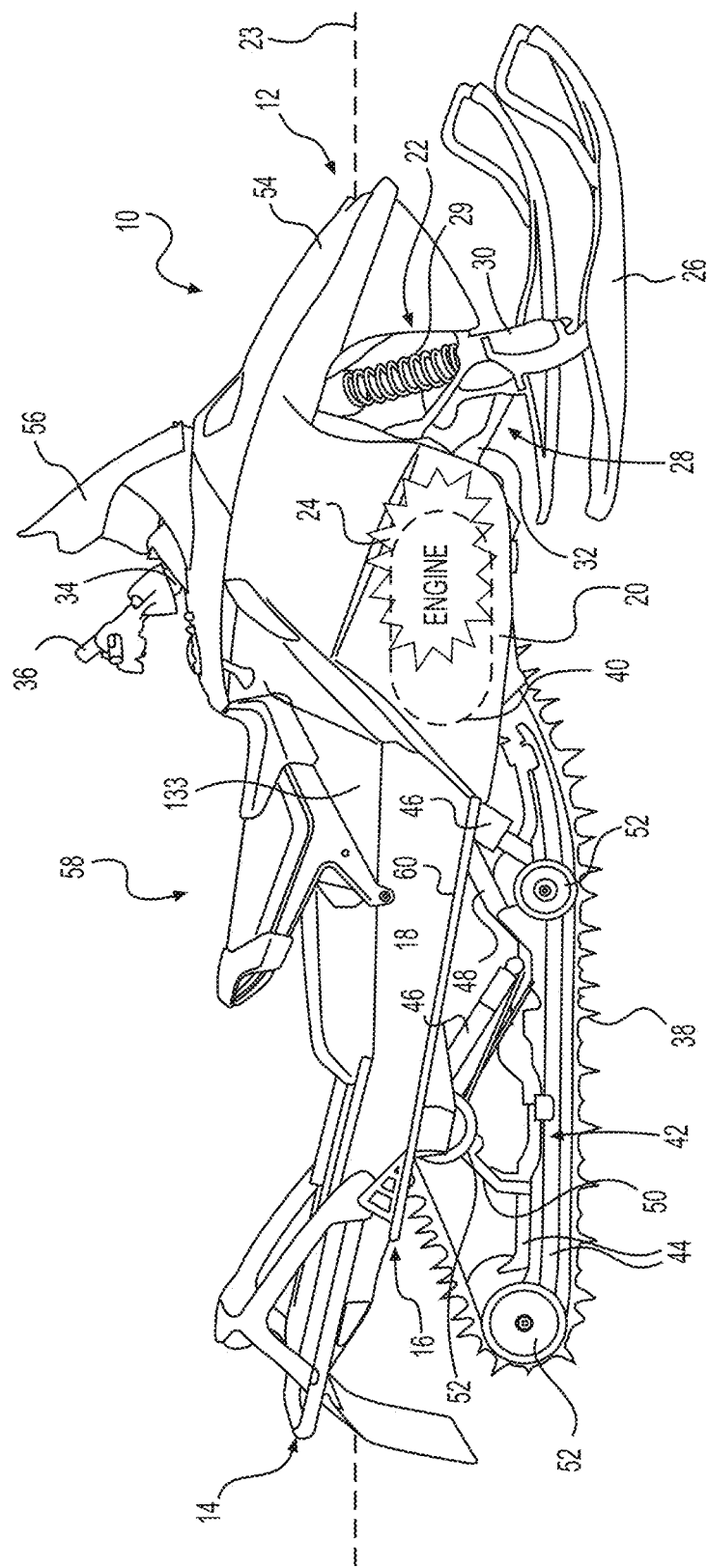
FIG. 1 is a right side perspective view of a snowmobile.

Turning now to FIG. 1, a snowmobile 10 includes a forward end 12 and a rearward end 14 that are defined consistently with a forward travel direction of the snowmobile 10. The snowmobile 10 includes a frame 16 that has a tunnel 18, an engine cradle portion 20 and a front suspension assembly portion 22. The tunnel 18 consists of one or more pieces of sheet metal arranged to form an inverted U-shape that is connected at the front to the engine cradle portion 20 and extends rearward therefrom along the longitudinal axis 23. An internal combustion engine 24 (schematically illustrated in FIG. 1) is carried by the engine cradle portion 20 of the frame 16. The internal combustion engine 24 is described in greater detail below. Two skis 26 are positioned at the forward end 12 of the snowmobile 10 and are attached to the front suspension assembly portion 22 of the frame 16 through a front suspension assembly 28. The front suspension assembly 28 includes shock absorber assemblies 29, ski legs 30, and supporting arms 32. Ball joints and steering rods (not shown) operatively connect the skis 26 to a steering column 34. A steering device in the form of handlebar 36 is attached to the upper end of the steering column 34 to allow a driver to rotate the ski legs 30 and thus the skis 26, in order to steer the snowmobile 10.

An endless drive track 38 is disposed generally under the tunnel 18 and is operatively connected to the engine 24 through a CVT 40 (schematically illustrated by broken lines in FIG. 1) which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding one or more of the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the engine 24 and the CVT 40, thereby providing an external shell that protects the engine 24 and the CVT 40. The fairings 54 include a hood and one or more side panels that can be opened to allow access to the engine 24 and the CVT 40 when this is required, for example, for inspection or maintenance of the engine 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward.

A straddle-type seat 58 is positioned over the tunnel 18. Two footrests 60 are positioned on opposite sides of the snowmobile 10 below the seat 58 to accommodate the driver's feet.

Figure 2:
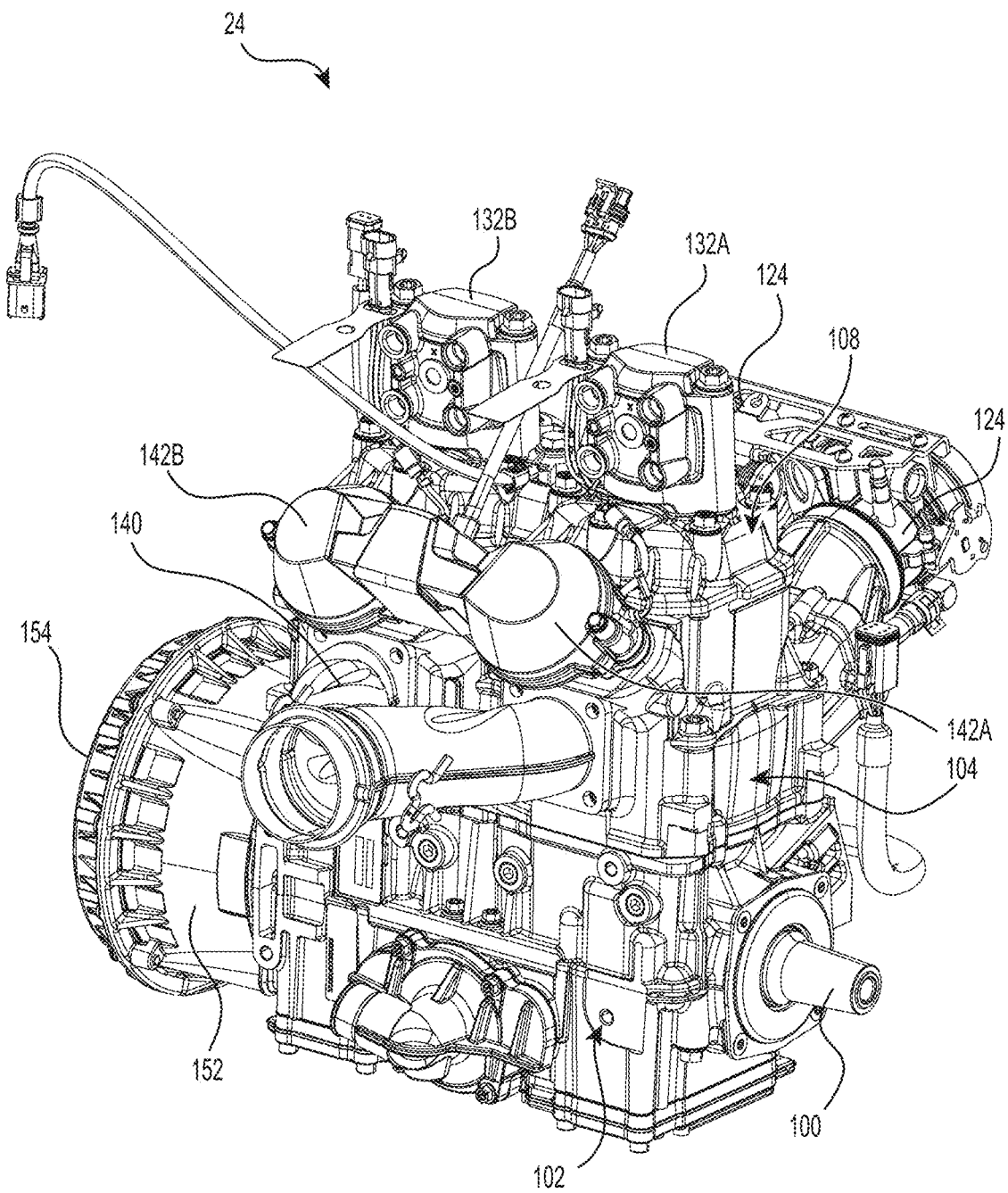
FIG. 2 is a perspective view taken from a front, left side of the internal combustion engine of the snowmobile of FIG. 1.
Figure 3:
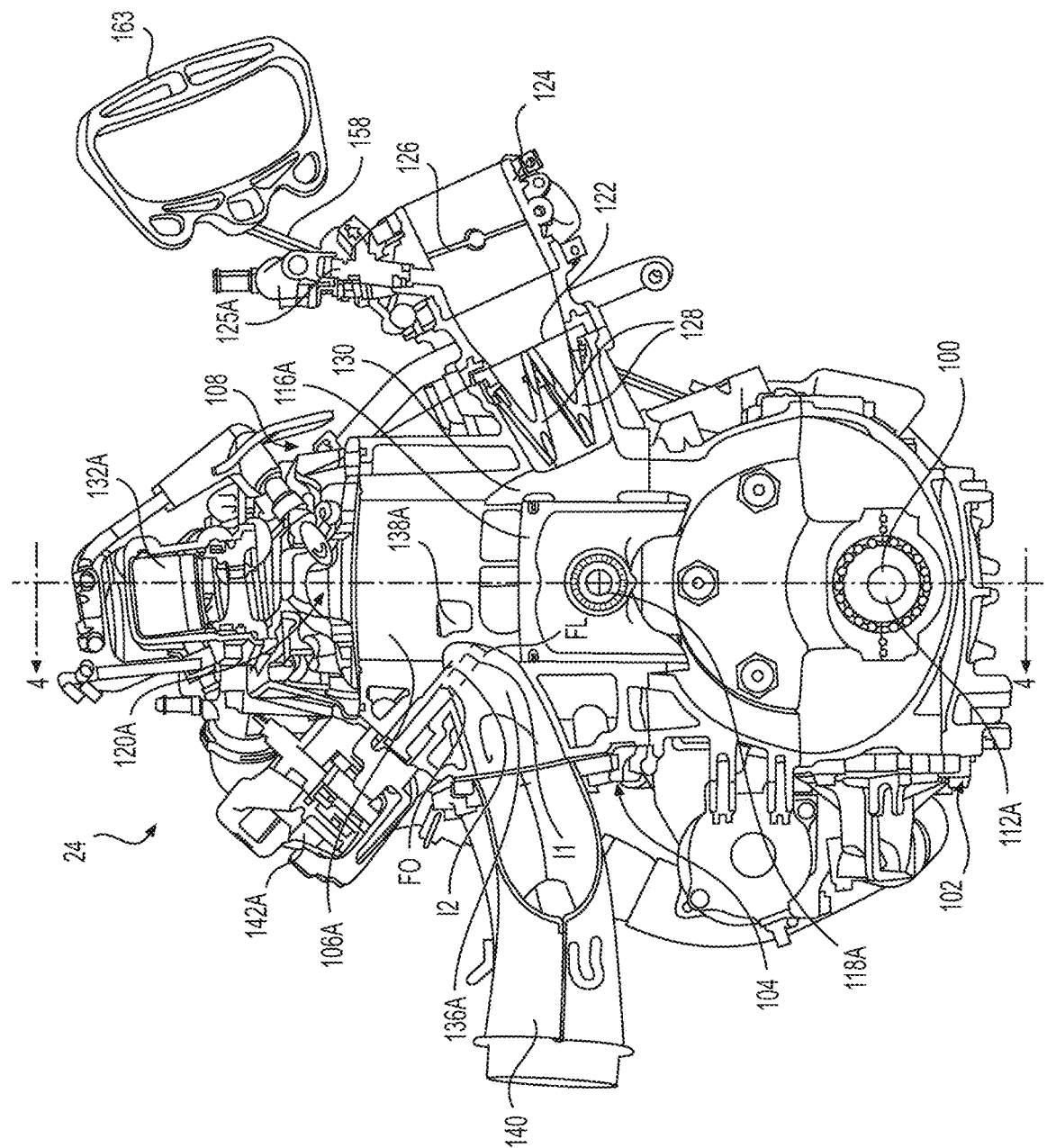
FIG. 3 is a cross-sectional view of the engine of FIG. 2 taken through line 3-3 of FIG. 4.
Figure 4:
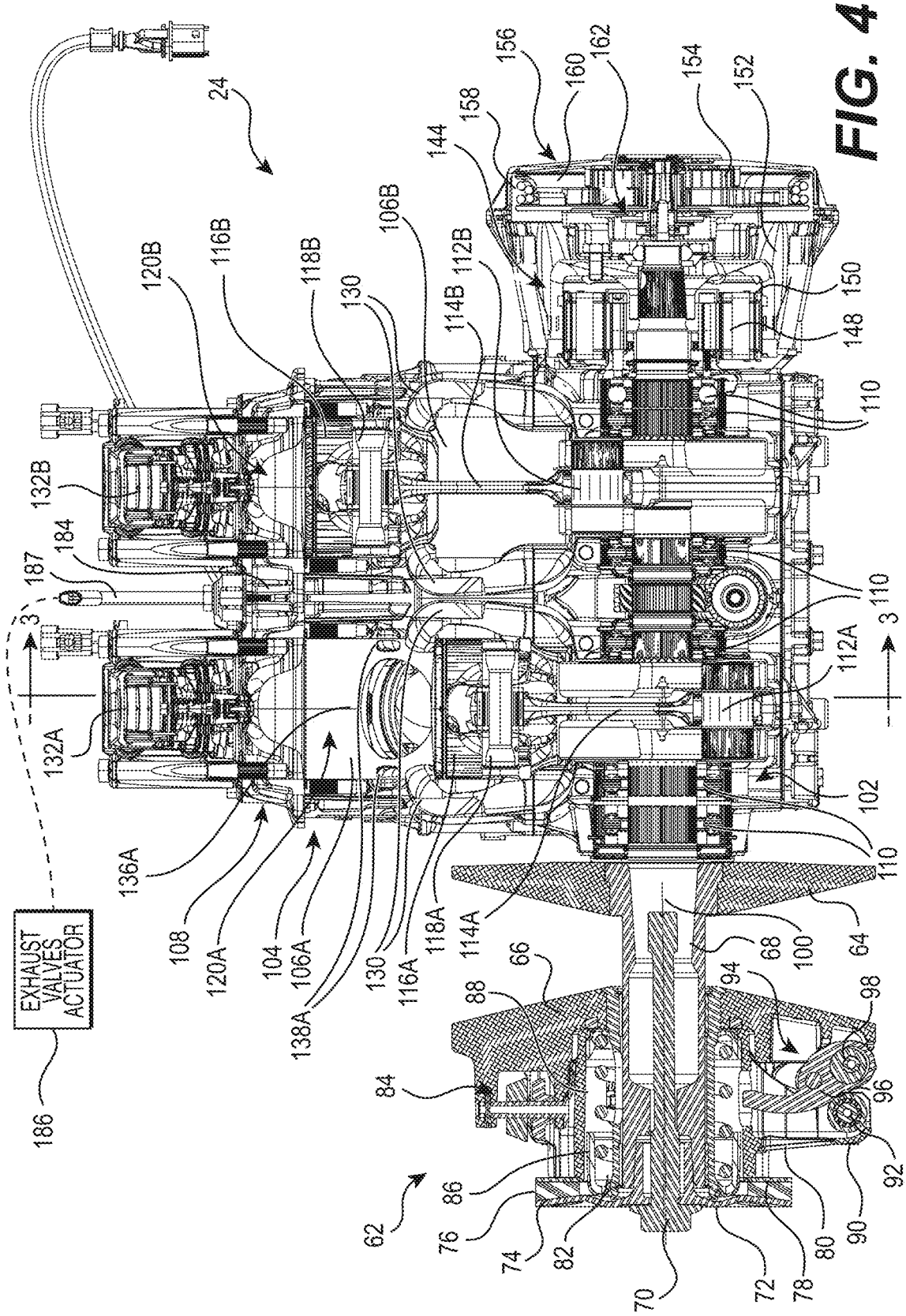
FIG. 4 is a cross-sectional view of the engine of FIG. 2 taken through line 4-4 of FIG. 3 with a drive pulley of a CVT mounted on a crankshaft of the engine.

Turning now to FIGS. 2 to 4, the internal combustion engine 24 and the CVT 40 will be described. The internal combustion engine 24 operates on the two-stroke principle. The engine 24 has a crankshaft 100 that rotates about a horizontally disposed axis that extends generally transversely to the longitudinal axis 23 of the snowmobile 10. The crankshaft 100 drives the CVT 40 for transmitting torque to the endless drive track 38 for propulsion of the snowmobile 10.

The CVT 40 includes a drive pulley 62 (FIG. 4) coupled to the crankshaft 100 to rotate with the crankshaft 100 and a driven pulley (not shown) coupled to one end of a transversely mounted jackshaft (not shown) that is supported on the frame 16 through bearings. The opposite end of the transversely mounted jackshaft is connected to the input member of a reduction drive (not shown) and the output member of the reduction drive is connected to a drive axle (not shown) carrying sprocket wheels (not shown) that form a driving connection with the drive track 38.

As can be seen in FIG. 4, the drive pulley 62 of the CVT 40 includes a pair of opposed frustoconical belt drive sheaves 64 and 66 between which a drive belt (not shown) is located. The drive belt is made of rubber, but it is contemplated that it could be made of metal linkages or of a polymer. The drive pulley 62 will be described in greater detail below. The driven pulley includes a pair of frustoconical belt drive sheaves between which the drive belt is located. The drive belt is looped around both the drive pulley 62 and the driven pulley. The torque being transmitted to the driven pulley provides the necessary clamping force on the drive belt through its torque sensitive mechanical device in order to efficiently transfer torque to the other powertrain components.

As discussed above, the drive pulley 62 includes a pair of opposed frustoconical belt drive sheaves 64 and 66 as can be seen in FIG. 4. Both sheaves 64 and 66 rotate together with the crankshaft 100. The sheave 64 is fixed in an axial direction relative to the crankshaft 100, and is therefore referred to as the fixed sheave 64. The fixed sheave 64 is also rotationally fixed relative to the crankshaft 100. The sheave 66 can move toward or away from the fixed sheave 64 in the axial direction of the crankshaft 100 in order to change the drive ratio of the CVT 40, and is therefore referred to as the movable sheave 66. As can be seen in FIG. 4, the fixed sheave 64 is disposed between the movable sheave 66 and the engine 24.

Figure 5:
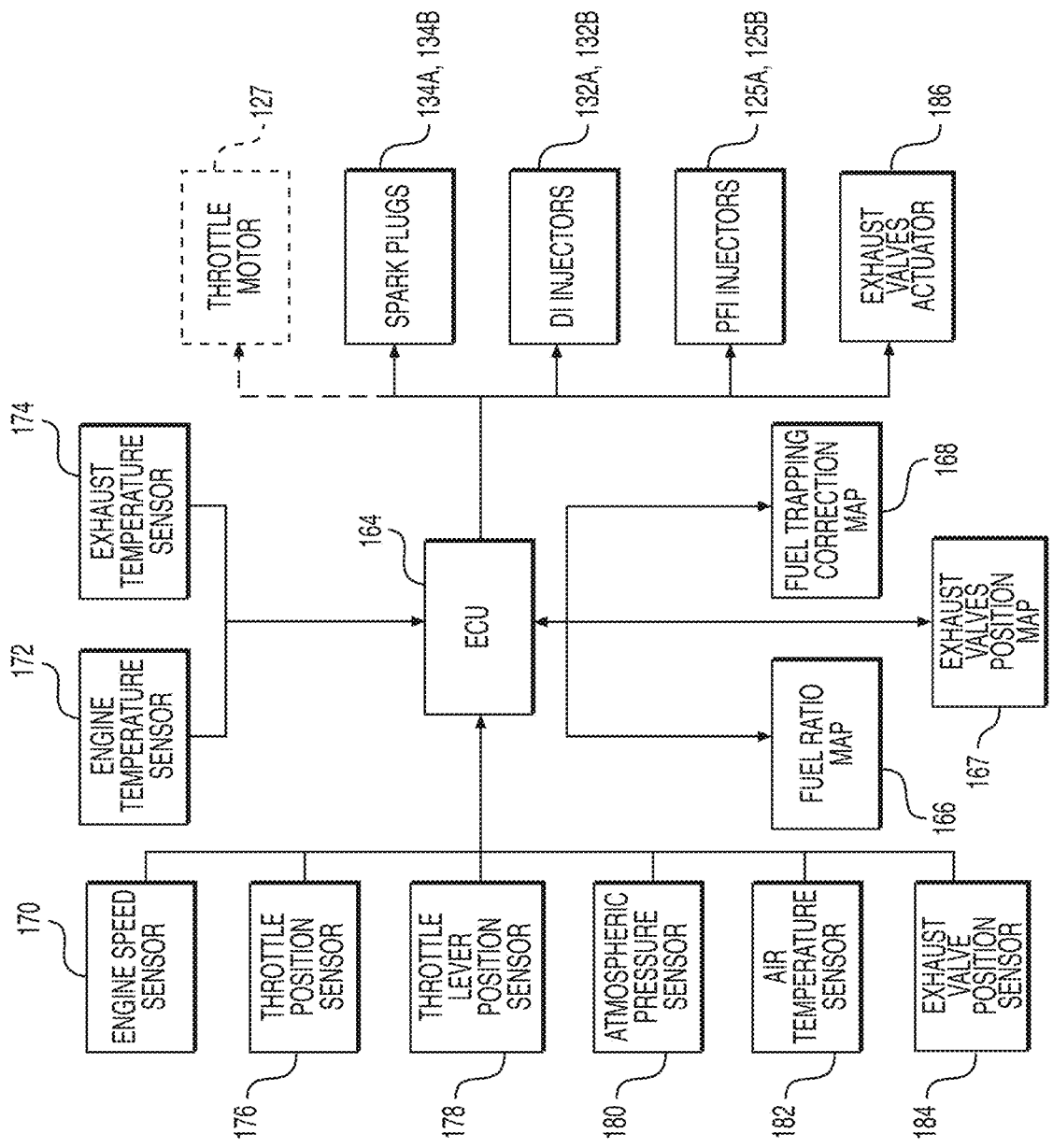
FIG. 5 is a schematic diagram of an electronic control unit (ECU) of the snowmobile of FIG. 1 and various components connected to the ECU.
Figure 6:
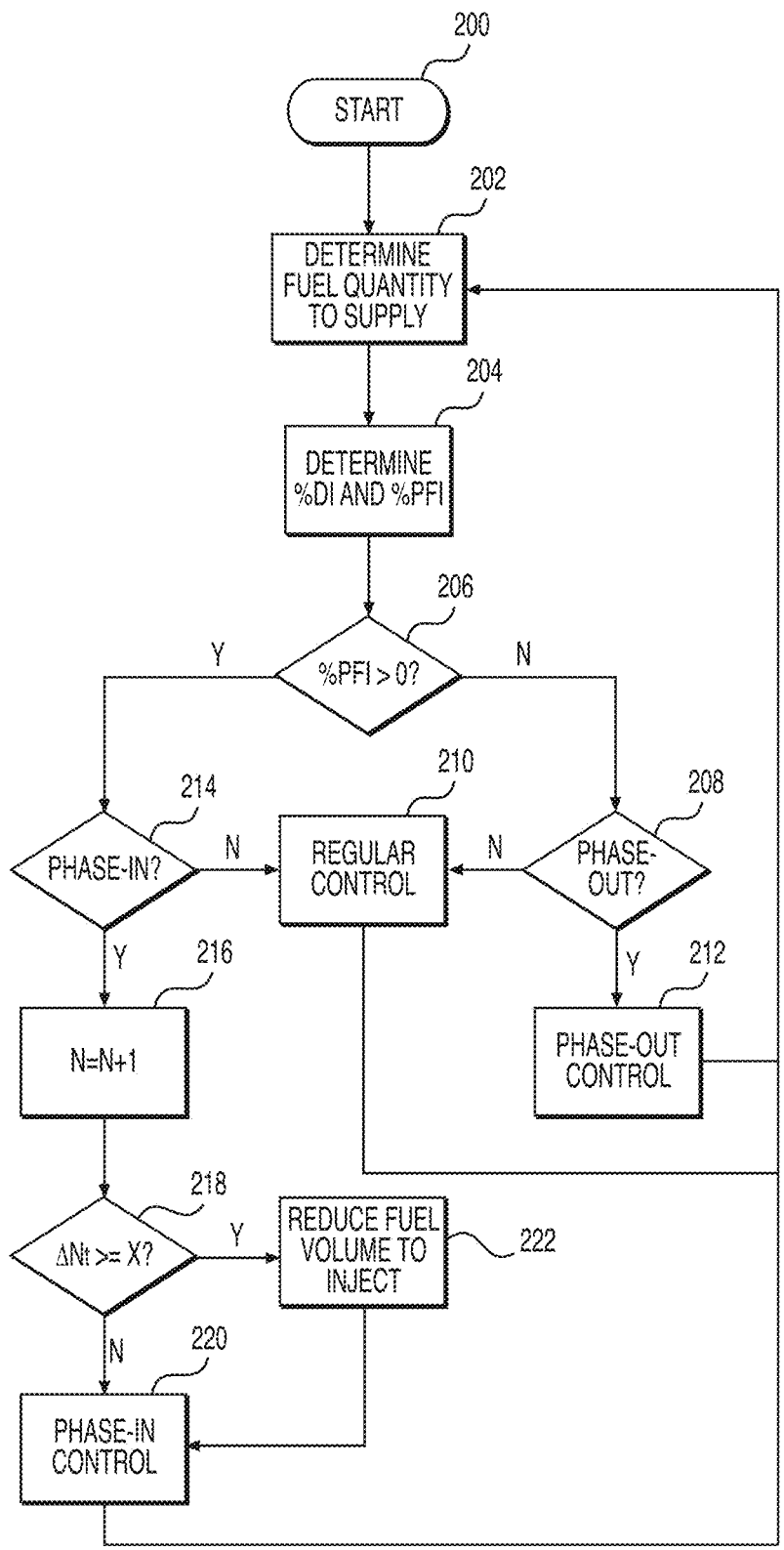
FIG. 6 is a logic diagram of a method for controlling the engine of FIG. 2.

The fixed sheave 64 is mounted on a fixed sheave shaft 68. The fixed sheave 64 is press-fitted on the fixed sheave shaft 68 such that the fixed sheave 64 rotates with the fixed sheave shaft 68. It is contemplated that the fixed sheave 64 could be connected to the fixed sheave shaft 68 in other known manners to make the fixed sheave 64 rotationally and axially fixed relative to the fixed sheave shaft 68. As can be seen in FIG. 5, the fixed sheave shaft 68 is hollow and has a tapered hollow portion. The tapered hollow portion receives the end of the crankshaft 100 therein to transmit torque from the engine 24 to the drive pulley 62. A fastener 70 is inserted in the outer end (i.e. the left side with respect to FIG. 4) of the drive pulley 62, inside the fixed sheave shaft 68, and screwed into the end of the crankshaft 100 to prevent axial displacement of the fixed sheave shaft 68 relative to the crankshaft 100. It is contemplated that the fixed sheave shaft 68 could be connected to the crankshaft 100 in other known manners to make the fixed sheave shaft 68 rotationally and axially fixed relative to the crankshaft 100. It is also contemplated that the crankshaft 100 could be the fixed sheave shaft 68.

A cap 72 is taper-fitted in the outer end of the fixed sheave shaft 68. The fastener 70 is also inserted through the cap 72 to connect the cap 72 to the fixed sheave shaft 68. It is contemplated that the cap 72 could be connected to the fixed sheave shaft 68 by other means. The radially outer portion of the cap 72 forms a ring 74. An annular rubber damper 76 is connected to the ring 74. Another ring 78 is connected to the rubber damper 76 such that the rubber damper 76 is disposed between the rings 74, 78. In the present implementation, the rubber damper 76 is vulcanized to the rings 74, 78, but it is contemplated that they could be connected to each other by other means such as by using an adhesive for example. It is also contemplated that the damper 76 could be made of a material other than rubber.

A spider 80 is disposed around the fixed sheave shaft 68 and axially between the ring 78 and the movable sheave 66. The spider 80 is axially fixed relative to the fixed sheave 64. Apertures (not shown) are formed in the ring 74, the damper 76, and the ring 78. Fasteners (not shown) are inserted through the apertures in the ring 74, the damper 76, the ring 78 and the spider 80 to fasten the ring 78 to the spider 80. As a result, torque is transferred between the fixed sheave shaft 68 and the spider 80 via the cap 72, the rubber damper 76 and the ring 78. The damper 76 dampens the torque variations from the fixed sheave shaft 68 resulting from the combustion events in the engine 24. The spider 80 therefore rotates with the fixed sheave shaft 68.

A movable sheave shaft 82 is disposed around the fixed sheave shaft 68. The movable sheave 66 is press-fitted on the movable sheave shaft 82 such that the movable sheave 66 rotates and moves axially with the movable sheave shaft 82. It is contemplated that the movable sheave 66 could be connected to the movable sheave shaft 82 in other known manners to make the movable sheave 66 rotationally and axially fixed relative to the shaft 82. It is also contemplated that the movable sheave 66 and the movable sheave shaft 82 could be integrally formed.

To transmit torque from the spider 80 to the movable sheave 104, a torque transfer assembly consisting of three roller assemblies 84 connected to the movable sheave 66 is provided. The roller assemblies 84 engage the spider 80 so as to permit low friction axial displacement of the movable sheave 66 relative to the spider 80 and to eliminate, or at least minimize, rotation of the movable sheave 66 relative to the spider 80. As described above, torque is transferred from the fixed sheave 64 to the spider 80 via the damper 76. The spider 80 engages the roller assemblies 84 which transfer the torque to the movable sheave 66 with no, or very little, backlash. As such, the spider 80 is considered to be rotationally fixed relative to the movable sheave 66. It is contemplated that in some implementations, the torque transfer assembly could have more or less than three roller assemblies 84.

As can be seen in FIG. 4, a biasing member in the form of a coil spring 86 is disposed inside a cavity 88 defined radially between the movable sheave shaft 82 and the spider 80. As the movable sheave 66 and the movable sheave shaft 82 move axially toward the fixed sheave 64, the spring 86 gets compressed. The spring 86 biases the movable sheave 66 and the movable sheave shaft 82 away from the fixed sheave 64 toward their position shown in FIG. 5. It is contemplated that, in some implementations, the movable sheave 66 could be biased away from the fixed sheave 64 by mechanisms other than the spring 86.

The spider 80 has three arms 90 disposed at 120 degrees from each other. Three rollers 92 are rotatably connected to the three arms 90 of the spider 80. Three centrifugal actuators 94 are pivotally connected to three brackets (not shown) formed by the movable sheave 66. Each roller 92 is aligned with a corresponding one of the centrifugal actuators 94. Since the spider 80 and the movable sheave 66 are rotationally fixed relative to each other, the rollers 92 remain aligned with their corresponding centrifugal actuators 94 when the shafts 68, 82 rotate. The centrifugal actuators 94 are disposed at 120 degrees from each other. The centrifugal actuators 94 and the roller assemblies 84 are arranged in an alternating arrangement and are disposed at 60 degrees from each other. It is contemplated that the rollers 92 could be pivotally connected to the brackets of the movable sheave 66 and that the centrifugal actuators 94 could be connected to the arms 90 of the spider 80. It is also contemplated that there could be more or less than three centrifugal actuators 94, in which case there would be a corresponding number of arms 90, rollers 92 and brackets of the movable sheave. It is also contemplated that the rollers 92 could be omitted and replaced with surfaces against which the centrifugal actuators 94 can slide as they pivot.

In the present implementation, each centrifugal actuator 94 includes an arm 96 that pivots about an axle 98 connected to its respective bracket of the movable sheave 66. The position of the arms 96 relative to their axles 98 can be adjusted. It is contemplated that the position of the arms 96 relative to their axles 98 could not be adjustable. Additional detail regarding centrifugal actuators of the type of the centrifugal actuator 94 can be found in International Application Publication No. WO 2013/032463 A2, published Mar. 7, 2013, the entirety of which is incorporated herein by reference.

The above description of the drive pulley 62 corresponds to one contemplated implementation of a drive pulley that can be used with the engine 24. It is contemplated that other types of drive pulleys could be used.

The engine 24 has a crankcase 102 housing a portion of the crankshaft 100. As can be seen in FIGS. 2 and 4, the crankshaft 100 protrudes from the crankcase 102. It is contemplated that the crankshaft 100 could drive an output shaft connected directly to the end of the crankshaft 100 or offset from the crankshaft 100 and driven by driving means such as gears in order to drive the drive pulley 62. It is also contemplated that the crankshaft 100 could drive, using gears for example, a counterbalance shaft housed in part in the crankcase 102 and that the drive pulley 62 could be connected to the counterbalance shaft, in which case, the crankshaft 100 does not have to protrude from the crankcase 102 for this purpose. A cylinder block 104 is disposed on top of and connected to the crankcase 102. The cylinder block 104 defines two cylinders 106A, 106B (FIG. 5). A cylinder head 108 is disposed on top of and is connected to the cylinder block 104.

As best seen in FIG. 4, the crankshaft 100 is supported in the crankcase 102 by bearings 110. The crankshaft 100 has two crank pins 112A, 112B. In the illustrated implementation where the two cylinders 106A, 106B are disposed in line, the crank pins 112A, 112B are provided at 180 degrees from each other. It is contemplated that the crank pins 112A, 112B could be provided at other angles from each other to account for other cylinder arrangements, such as in a V-type engine. A connecting rod 114A is connected to the crank pin 112A at one end and to a piston 116A via a piston pin 118A at the other end. As can be seen, the piston 116A is disposed in the cylinder 106A. Similarly, a connecting rod 114B is connected to the crank pin 112B at one end and to a piston 116B via a piston pin 118B at the other end. As can be seen, the piston 116B is disposed in the cylinder 106B. Rotation of the crankshaft 100 causes the pistons 116A, 116B to reciprocate inside their respective cylinders 106A, 106B. The cylinder head 108, the cylinder 106A and the piston 116A define a variable volume combustion chamber 120A therebetween. Similarly, the cylinder head 108, the cylinder 106B and the piston 116B define a variable volume combustion chamber 120B therebetween. It is contemplated that the cylinder block 104 could define more than two cylinders 106, in which case the engine 24 would be provided with a corresponding number of pistons 116 and connecting rods 114.

Air is supplied to the crankcase 102 via a pair of air intake ports 122 (only one of which is shown in FIG. 3) formed in the back of the cylinder block 104. It is contemplated that the air intake ports 122 could be formed in the crankcase 102. It is also contemplated that there could be more than one air intake port 122 per cylinder 106. A pair of throttle bodies 124 is connected to the pair of air intake ports 122. Each throttle body 124 has a throttle plate 126 that can be rotated to control the air flow to the engine 24. One or more throttle cables connected to a throttle lever are used to change to position of the throttle plates 126. In an alternative implementation, a throttle motor 127 (schematically shown in dotted lines in FIG. 5) could be used to change the position of the throttle plates 126. It is also contemplated that each throttle plate 126 could be actuated by its own throttle motor 127. A pair of port fuel injectors 125A, 125B is connected to the pair of throttle bodies 124 (i.e. one fuel injector 125 per throttle body 124) to inject fuel directly in the throttle bodies 124 as will be described in greater detail below. It is contemplated that the fuel injectors 125A, 125 could alternatively be connected to the crankcase 102 and/or the cylinder block 104 to inject fuel directly in the crankcase 102 or in the scavenge ports 130. A pair of reed valves 128 (FIG. 4) are provided in each intake port 122. The reed valves 128 allow air and fuel to enter the crankcase 102, but prevent air from flowing out of the crankcase 102 via the air intake ports 122.

As the pistons 116A, 116B reciprocate, air from the crankcase 102 flows into the combustion chambers 120A, 120B via scavenge ports 130. It is contemplated that each combustion chamber 120A, 120B could communicate with multiple scavenge ports 130. Fuel is injected directly in the combustion chambers 120A, 120B by direct fuel injectors 132A, 132B respectively as will be described in greater detail below. The direct fuel injectors 132A, 132B are mounted to the cylinder head 108. In the illustrated implementation, the direct fuel injectors 132A, 132B are E-TEC™ fuel injectors, however other types of direct fuel injectors are contemplated. The direct fuel injectors 132A, 132B can supply a fuel to produce a stratified charge or a homogeneous charge depending on the operating conditions of the engine 24. The fuel-air mixture in the combustion chamber 120A, 120B is ignited by spark plugs 134A, 134B respectively (not shown in FIGS. 2 to 4, but schematically illustrated in FIG. 5). The spark plugs 134A, 134B are mounted to the cylinder head 108.

To evacuate the exhaust gases resulting from the combustion of the fuel-air mixture in the combustion chambers 120A, 120B, each cylinder 116A, 116B defines one main exhaust port 136A, 136B respectively and two auxiliary exhaust ports 138A, 138B respectively. It is contemplated that each cylinder 116A, 116B could have only one, two or more than three exhaust ports. The exhaust ports 136A, 136B, 138A, 138B are connected to an exhaust manifold 140. The exhaust manifold 140 is connected to the front of the cylinder block 104. Exhaust valves 142A, 142B mounted to the cylinder block 104, control a degree of opening of the exhaust ports 136A, 136B, 138A, 138B. In the present implementation, the exhaust valves 142A, 142B are R.A.V.E.™ exhaust valves, but other types of valves are contemplated. It is also contemplated that the exhaust valves 142A, 142B could be omitted. It is also contemplated that the auxiliary exhaust ports 138A, 138B could be omitted.

The position of the exhaust valves 142A, 142B is determined by an electronic control unit (ECU) 164, described in more detail below, at least in part based on the throttle position and the engine speed. The ECU 164 makes this determination using an exhaust valves position map 167 shown in FIG. 8B. It should be understood that the exhaust valves position map 167 shown in FIG. 8B is an exemplary map. Different engines and/or desired performance characteristics could require different exhaust valves position maps. In the exhaust valves position map 167, the throttle position is given as a percentage of opening of the throttle plate 126, with 0% being a minimum position of the throttle plate 126 and 100% being a wide-open throttle plate position. It is also contemplated that the position of the exhaust valves 142A, 142B could be determined using one or more algorithms. It is also contemplated that the ECU 164 could have multiple exhaust valves position maps 167 corresponding to different modes of operation of the engine 24 that can be selected by a user of the snowmobile 10.

As can be seen in the exhaust positions map 167 shown in FIG. 8B, in the present implementations, the exhaust valves 142A, 142B can have one of four positions: a fully lowered (FL) position, a first intermediate (I1) position, a second intermediate (I2) position, and a fully opened (FO) position. These positions have also been labeled in FIG. 3. It is contemplated that the exhaust valves 142A, 142B could have less or more than four positions. The FL position is the position in which the exhaust valves 142A, 142B restrict fluid flow through the main exhaust ports 138A, 138B the most. The FO position is the position in which the exhaust valves 142A, 142B restrict fluid flow through the main exhaust ports 138A, 138B the least or, in some implementations, not at all. The I1 position is a position of the exhaust valves 142A, 142B that is intermediate the FL and FO positions. The I2 position is a position of the exhaust valves 142A, 142B that is intermediate the I1 and FO positions. Once the ECU 164 has determined the position of the exhaust valves 142A, 142B, the ECU 164 sends a signal to an exhaust valves actuator 186 (FIG. 5) to move the exhaust valves 142A, 142B to this position. In the present implementation, the exhaust valves actuator 186 is an electric motor that pushes or pulls on a push-pull cable 187 (FIG. 4) that moves both exhaust valves 142A, 142B together.

An alternator 144 (FIG. 4) is connected to the end of the crankshaft 100 opposite the end of the crankshaft 100 that is connected to the drive pulley 62. It is contemplated that the alternator 144 could be connected to another shaft operatively connected to the crankshaft 100, by gears for example. The alternator 144 is turned by the crankshaft 100 and generates electricity that is supplied to a battery (not shown) and to other electrical components of the engine 24 and the snowmobile 10.

As can be seen in FIG. 4, the alternator 144 has a stator 148 and a rotor 150. The stator 148 is disposed around the crankshaft 100 outside of the crankcase 102 and is fastened to the crankcase 102. The rotor 150 is connected by splines to the end of the crankshaft 100 and partially houses the stator 148. A housing 152 is disposed over the alternator 144 and is connected to the crankcase 102. A cover 154 is connected to the end of the housing 152.

As can also be seen in FIG. 4, a recoil starter 156 is disposed inside the space defined by the housing 152 and the cover 154, between the cover 154 and the alternator 144. The recoil starter 156 has a rope 158 wound around a reel 160. A ratcheting mechanism 162 selectively connects the reel 160 to the rotor 150. To start the engine 24 using the recoil starter 156, a user pulls on a handle 163 (FIG. 3) connected to the end of the rope 158. This turns the reel 160 in a direction that causes the ratcheting mechanism 162 to lock, thereby turning the rotor 150 and the crankshaft 100. The rotation of the crankshaft 100 causes the pistons 116A, 116B to reciprocate which permits fuel injection and ignition to occur, thereby starting the engine 24. When the engine 24 starts, the rotation of the crankshaft 100 relative to the reel 160 disengages the ratcheting mechanism 162, and as such the crankshaft 100 does not turn the reel 160. When the user releases the handle 163, a spring (not shown) turns the reel 160 thereby winding the rope 158 around the reel 160. It is contemplated that the recoil starter 156 could be omitted.

In the present implementation, the drive pulley 62 and the alternator 144 are both mounted to the crankshaft 100. It is contemplated that the drive pulley 62 and the alternator 144 could both be mounted to a shaft other than the crankshaft 100, such as a counterbalance shaft for example. In the present implementation, the drive pulley 62, the alternator 144 and the recoil starter 56 are all coaxial with and rotate about the axis of rotation of the crankshaft 100. It is contemplated that the drive pulley 62, the alternator 144 and the recoil starter 56 could all be coaxial with and rotate about the axis of rotation of a shaft other than the crankshaft 100, such as a counterbalance shaft for example. It is also contemplated that at least one of the drive pulley 62, the alternator 144 and the recoil starter 56 could rotate about a different axis. In the present implementation, the drive pulley 62 is disposed on one side of the engine 24 and the alternator 144 and the recoil starter 56 are both disposed on the other side of the engine 24. It is contemplated the alternator 144 and/or the recoil starter 56 could be disposed on the same side of the engine 24 as the drive pulley 62.

The fuel injectors 125A and 132A will now be described in more detail with respect to FIG. 3. The fuel injectors 125B and 132B are similarly arranged with respect to the components associated with the combustion chamber 120B and as such will not be described in greater detail herein.

The port fuel injector 125A injects fuel directly in the throttle body 124 that fluidly communicates with the combustion chamber 120A at a location between the throttle plate 126 and the air intake port 122. It is contemplated that the port fuel injector 125A could inject fuel at other positions upstream of the combustion chamber 120A, such as in the interior of the crankcase 102 or the scavenge port 130. It is also contemplated that the port fuel injector 125A could inject fuel at positions upstream of the throttle plate 126. The fuel injected by the port fuel injector 125A flows with the air flowing through the throttle body 124 into the crankcase 102, then through the scavenge port 130 and into the combustion chamber 120A to be combusted. The port fuel injector 125A is connected to the top of the throttle body 124. The port fuel injector 125A is angled relative to a central axis of the throttle body 124 such that fuel is injected by the port fuel injector 125A flows generally toward the bottom of the throttle body 124 and toward the air intake port 122. When the port fuel injector 125A is initially actuated following a period where it has not been used to inject fuel while the engine 24 is in operation, a portion of the fuel injected by the port fuel injector 125A that flows into the crankcase 102 sticks to surfaces of the engine 24 that are downstream of the port fuel injector 125A, such as the surfaces of the interior of the crankcase 102, of components of the engine 24 that are in the crankcase 102, and of the scavenge port 130. The method described in detail below compensates for this portion of fuel that does not reach the combustion chamber 120A.

The direct fuel injector 132A injects fuel directly into the combustion chamber 120A toward the piston 116A. More specifically, the direct fuel injector 132A injects fuel into a domed portion of the combustion chamber 120A defined by the cylinder head 108. The direct fuel injector 132A injects fuel at an angle to a reciprocation axis of the piston 116A such that fuel injected by the direct fuel injector 132A flows generally toward the piston 116A and away from the exhaust ports 136A, 138A.

The fuel injectors 125A, 125B, 132A, 132B are connected by fuel lines and/or rails (not shown) to one or more fuel pumps that pump fuel from a fuel tank 161 (FIG. 1) of the snowmobile 10.

Turning now to FIG. 5, the ECU 164 of the snowmobile 10 and various components connected to the ECU 164 will be described. The ECU 164 is used to control the operation of the engine 24 by control the actuation of its components such as the fuel injectors 125A, 125B, 132A, 132B, the spark plugs 134A, 134B and the throttle motor 127 (should one be provided). Although a single ECU 164 is illustrated, it is contemplated that the various tasks of the ECU 164 could be split between various electronic modules. To control the operation of the engine 24, the ECU 164 receives multiple inputs from sensors which will be described below. Using these inputs, the ECU 164 obtains information from control maps, such as the control maps 166, 168 which are described in greater detail below, and control map 167 described above, and uses information from these maps to control the engine 24. The control maps are stored in an electronic data storage device, such as a hard disk drive or a flash drive. It is contemplated that instead of or in addition to the control maps, the ECU 164 could use control algorithms to control the engine 24. In the present implementation, the ECU 164 is connected with the various components illustrated in FIG. 5 via wired connections; however it is contemplated that it could be connected to one or more of these components wirelessly.

An engine speed sensor 170 is disposed in the vicinity of the crankshaft 100 in order to sense the speed of rotation of the crankshaft 100, commonly referred to as the engine speed. The engine speed sensor 170 sends a signal representative of the speed of rotation of the crankshaft 100 to the ECU 164. It is contemplated that the engine speed sensor 170 could alternatively sense the position of an element other than the crankshaft 100 that turns with the crankshaft 100, such as the rotor 150 of the alternator 144 for example, and be able to determine the engine speed from the speed of rotation of this element.

An engine temperature sensor 172 is mounted to the engine 24 to sense the temperature of one or more of the engine coolant, the crankcase 102, the cylinder block 104 and the cylinder head 108. The engine temperature sensor 172 sends a signal representative of the sensed temperature to the ECU 164.

An exhaust temperature sensor 174 is mounted to the exhaust manifold 140 or another portion of an exhaust system of the snowmobile 10 to sense the temperature of the exhaust gases. The exhaust temperature sensor 174 sends a signal representative of the temperature of the exhaust gases to the ECU 164.

A throttle position sensor 176 is mounted to one of the throttle bodies 124 to sense an angular position of its throttle plate 126, commonly referred to as the throttle position. The throttle position sensor 176 sends a signal representative of the throttle position to the ECU 164. It is contemplated that the throttle position sensor 176 could sense the position of both throttle plates 126. It is also contemplated that two throttle position sensors 176 (one per throttle body 124) could be provided. It is also contemplated that the throttle position sensor 176 could alternatively sense the position of a component used to actuate the throttle plate 126, such as the position of a shaft of the throttle motor 127, should one be provided, and that the ECU 164 could determine the throttle position from the position of this component.

A throttle lever position sensor 178 is mounted to the right handle of the handlebar 36 of the snowmobile 10 to sense an angular position of a throttle lever (not shown). The throttle lever is actuated by the driver of the snowmobile 10 such that the driver can control the desired speed and acceleration of the snowmobile 10. The throttle lever position sensor 178 sends a signal representative of the throttle lever position to the ECU 164.

An atmospheric air pressure sensor 180 is mounted to the snowmobile 10, in the air intake system for example, to sense the atmospheric air pressure. The atmospheric air pressure sensor 180 sends a signal representative of the atmospheric air pressure to the ECU 164.

An air temperature sensor 182 is mounted to the snowmobile 10, in the air intake system for example, to sense the temperature of the air to be supplied to the engine 24. The air temperature sensor 182 sends a signal representative of the air temperature to the ECU 164.

An exhaust valve position sensor 184 (FIG. 4) senses the position of the exhaust valves 142A, 142B and sends a signal representative of the this position to the ECU 164. The ECU 164 uses this signal to determine if the exhaust valves 142A, 142B are in the position determined as described above.

It is contemplated that one or more of the sensors 170, 172, 174, 176, 178, 180, 182, 184 could be omitted. It is also contemplated that one or more of the sensors 170, 172, 174, 176, 178, 180, 182, 184 could be used only under certain conditions.

The ECU 164 uses the inputs received from at least some of the sensors 170, 172, 174, 176, 178, 180, 182, 184 to retrieve one or more corresponding control maps 166, 167, 168 and to control the port fuel injectors 125A, 125B, the direct fuel injectors 132A, 132B, the spark plugs 134A, 134B, the throttle motor 127 (should one be provided), and the exhaust valves actuator 186 using these inputs and/or the control maps.

The ECU 164 is also connected to a display (not shown) provided on the snowmobile 10 near the handlebar 36 to provide information to the user of the snowmobile 10, such as engine speed, vehicle speed, oil temperature, and fuel level, for example.

Figure 7:
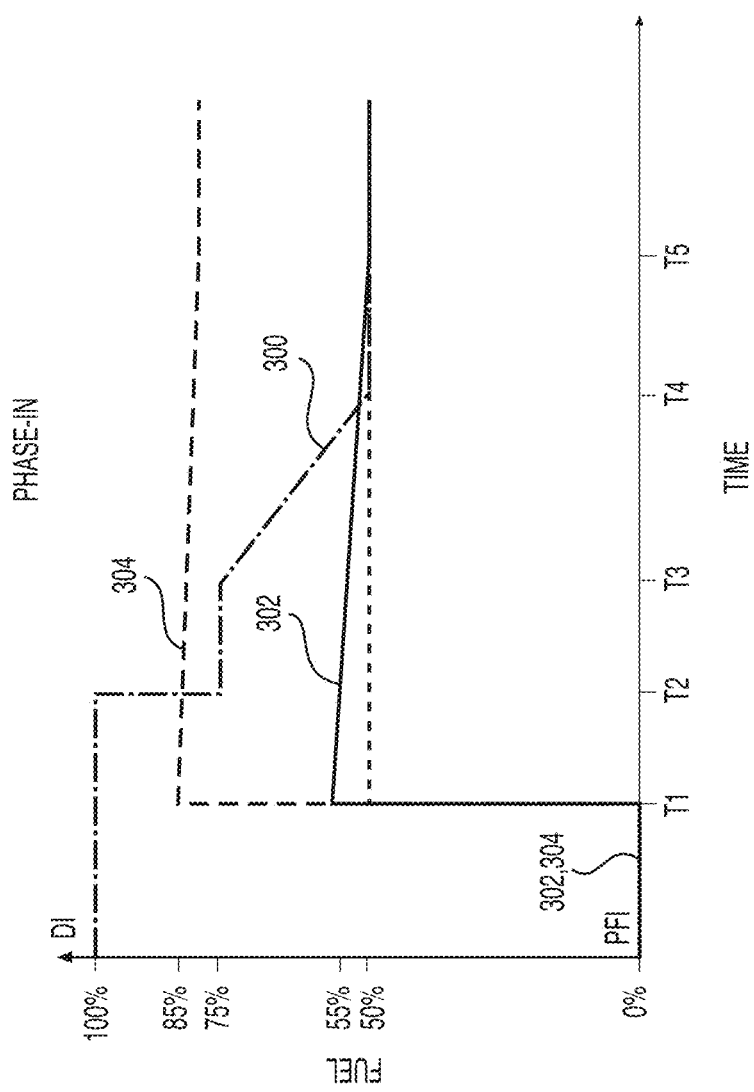
FIG. 7 is a graph illustrating a phase-in control of the method of FIG. 6.
Figure 10:
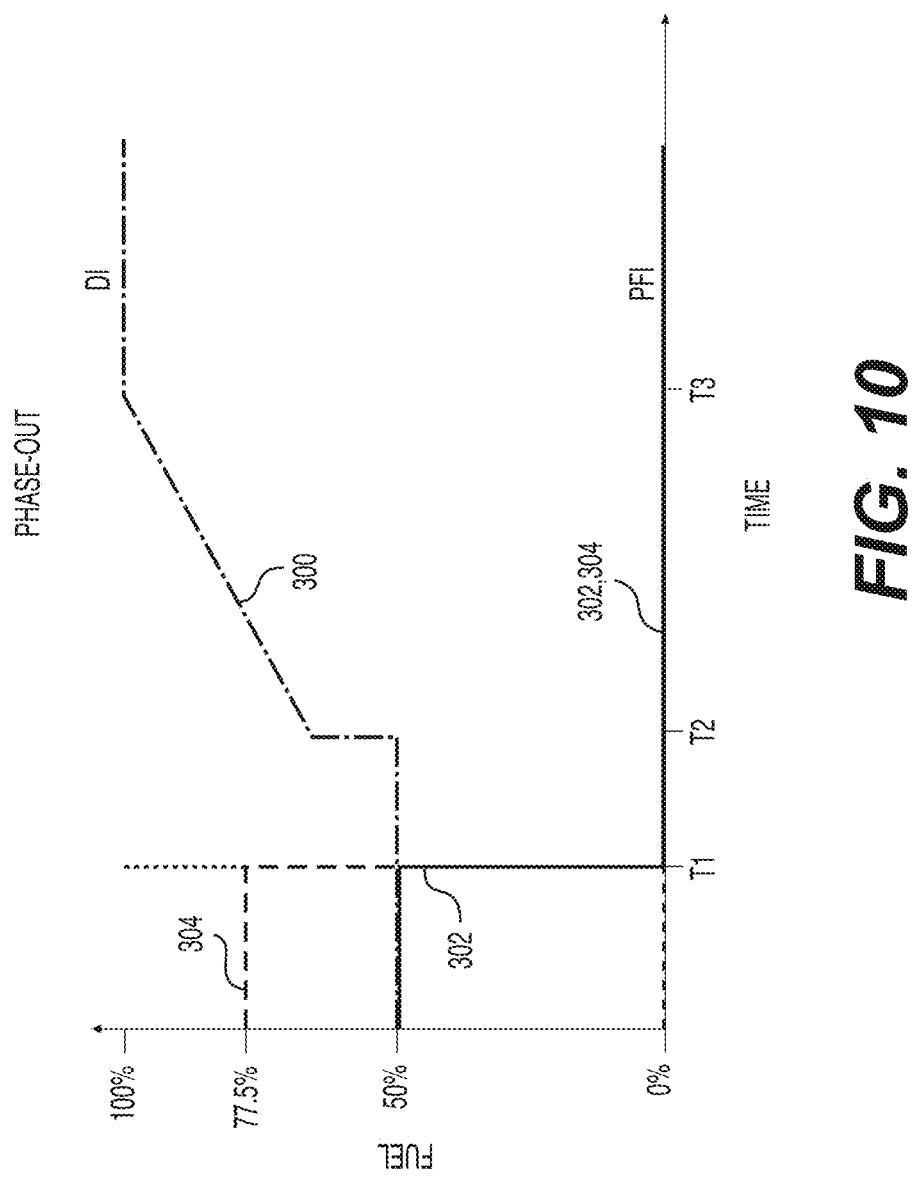
FIG. 10 is a graph illustrating a phase-out control of the method of FIG. 6.

Turning now to FIGS. 6 to 10, a method for controlling the engine 24 will be described. For simplicity, the method will be described with respect to only the cylinder 106A and its associated components. It should be understood that the method is also being carried out in the same manner with respect to the cylinder 106B and its associated components. It should also be noted that the time values t1 to t5 in FIGS. 7 and 10 are intended to merely indicate the sequence of events, that the spacing between subsequent time values is not necessarily representative of a relative amount of time between these events, and that the values of t1 to t3 in FIG. 7 do not correspond to the values of t1 to t3 in FIG. 10. The method begins at step 200.

Following step 200, at step 202 the ECU 164 determines the primary fuel quantity to be supplied to the combustion chamber 120A. The ECU 164 makes this determination in two parts. The first part consists in determining the base fuel quantity to be supplied and the second part consists in determining a correction factor.

To determine the base fuel quantity, the ECU 164 first determines the engine speed and throttle position from the signals received from the engine speed sensor 170 and the throttle position sensor 176 respectively. Then, using the engine speed and throttle position, the ECU 164 retrieves from a base fuel quantity map (not shown) a corresponding base fuel quantity. It is contemplated that other operating conditions of the engine 24 and/or snowmobile 10 could be taken into consideration to determine the base fuel quantity. It is also contemplated that the base fuel quantity could be calculated by the ECU 164 using an algorithm.

To determine the correction factor, the ECU 164 first determines one or more of the atmospheric pressure, the air temperature, the engine temperature and the exhaust temperature from the signals received from the atmospheric pressure sensor 180, the air temperature sensor 182, the engine temperature sensor 172 and the exhaust temperature sensor 174 respectively. The ECU 164 then determines one or more secondary correction factors corresponding to the one or more of the atmospheric pressure, the air temperature, the engine temperature and the exhaust temperature from one or more maps or using an algorithm. The ECU 164 then combines the secondary correction factors to obtain the correction factor. It is contemplated that the correction factor could be a combination of correction factors of other operating conditions of the engine 24 and/or snowmobile 10.

Once the ECU 164 has determined the base fuel quantity and the correction factor, the ECU 164 combines the two to obtain the primary fuel quantity. For example, if the ECU 164 determines that the base fuel quantity to be injected is Y mm$^3$ and that the correction factor is 104%, then the primary fuel quantity to be injected determined at step 202 is 1.04Y mm$^3$. A correction factor is applied in the present implementation since the base fuel quantity map has been calibrated for specific operating conditions (temperature, pressure, etc.). The correction factor accounts for the difference(s) between the operating conditions at which the base fuel quantity maps has been calibrated and the actual operating conditions of the engine 24/snowmobile 10. Alternatively, it is contemplated that the primary fuel quantity could be obtained from multiple fuel quantity maps, each one of which would be calibrated for different operating conditions, and as such no correction factor would be required. It is also contemplated that multiple fuel quantity maps could be used in combination with a correction factor. For example, multiple maps for different air temperatures could be provided with a correction factor being used for variations in atmospheric air pressure.

Once the primary quantity of fuel to be injected in the combustion chamber 120A has been determined at step 202, then at step 204 the ECU 164 determines the ratio of the primary fuel quantity that is to be injected by the direct fuel injector 132A (hereinafter the % DI) and the ratio of the primary fuel quantity that is to be injected by the port fuel injector 125A (hereinafter the % PFI). In the present implementation, the ECU 164 makes this determination using the fuel ratio map 166 shown in FIG. 8A. It should be understood that the fuel ratio map 166 shown in FIG. 8A is an exemplary map. Different engines and/or desired performance characteristics could require different fuel ratio maps. The fuel ratio map 166 provides the % PFI as a percentage for a given throttle position and engine speed. Generally, the % PFI values will be higher for an engine 24 calibrated to offer high performance and/or high acceleration compared to an engine 24 calibrated to offer fuel economy and/or low emissions. In the fuel ratio map 166, the throttle position is given as a percentage of opening of the throttle plate 126, with 0% being a minimum position of the throttle plate 126 and 100% being a wide-open throttle plate position. The ECU 164 determines the % PFI by retrieving from the fuel ratio map 166 the % PFI corresponding to the engine speed and throttle position used above at step 202. The ECU 164 determines the % DI by subtracting the % PFI from 100%. It is contemplated that the fuel ratio map could provide the % DI instead of the % PFI. It is also contemplated that the % DI and % PFI could be determined using one or more algorithms. It is also contemplated that the ECU 164 could have multiple fuel ratio maps 166 corresponding to different modes of operation of the engine 24 that can be selected by a user of the snowmobile 10.

As can be seen in FIG. 8A, at low engine speeds and/or low throttle positions, the % PFI is 0%. This means that at low engine speeds and/or low throttle positions fuel is to be supplied to the combustion chamber 120A only by the direct fuel injector 132A (i.e. the port fuel injector 125A supplies 0% of the fuel). In some implementations, over a range of engine speeds and a small range of low throttle positions, the direct fuel injector 132A supplies fuel to produce a stratified charge. In one implementation, the direct fuel injector 132A supplies fuel to produce a stratified charge only at less than 4500 RPM and a throttle position of less than 5%. Outside of this range, the direct fuel injector 132A supplies fuel to produce a homogeneous charge. As can be seen in FIG. 8A, in the range of engine speeds and throttle positions where the direct fuel injector 132A supplies fuel to produce a stratified charge, fuel is to be supplied to the combustion chamber 120A only by the direct fuel injector 132A. As can be seen by comparing the fuel ratio map 166 of FIG. 8A to the exhaust valves position map 167 of FIG. 8B, whenever the exhaust valve 142A is in the FO position, the % PFI is greater than 0%. In other words, whenever the exhaust valve 142A is in the FO position, fuel is injected by both the direct fuel injector 132A and the port fuel injector 125A. As can also be seen by comparing the fuel ratio map 166 of FIG. 8A to the exhaust valves position map 167 of FIG. 8B, whenever the % PFI is 0%, the exhaust valve 142A is either in the FL position or the Il position. In other words, whenever fuel is injected by the direct fuel injector 132A only, the exhaust valve 142A is never in the FO position.

Then, at step 206 the ECU 164 determines if the % PFI determined at step 204 is greater than 0. It should be understood that determining if the % DI is less than 100% would be equivalent.

If at step 206 the ECU 164 determines that the % PFI is not greater than 0% (i.e. the % PFI is 0%), then at step 208 the ECU 164 determines if the port fuel injector 132A is being phased-out, meaning that it was previously being used and should no longer be used. For example, if in the previous cycle the engine speed was 6000 RPM and the throttle position was 30%, the % PFI was 45%, and now the engine speed is 6000 RPM and the throttle position is 25%, the % PFI is 0%. Since the % PFI has changed from 45% to 0%, the port fuel injector 132A is being phased out. If in two consecutive cycles the % PFI changes from a non-zero value to 0%, the ECU 164 determines that phase-out occurs. If in two consecutive cycles the % PFI remains 0%, the ECU 164 determines that no phase-out occurs. For ease of visualization, the border between zero and non-zero values of % PFI in the fuel ratio map 166 has been drawn using a dash-dot line in FIG. 8A. For ease of comparison between the maps 166, 167 of FIGS. 8A, 8B a corresponding dash-dot line has been drawn in FIG. 8B.

If at step 208 the ECU 164 determines that phase-out is not occurring, then the ECU 164 continues at step 210 and controls the engine 24 (i.e. the fuel injectors 125A, 132A, the spark plug 134A . . . ) according to the regular control and then returns to step 202. It should be understood that for purposes of the present application, the regular control does not refer to any particular control, but is rather intended to mean any control to be used for the current operating conditions of the engine 24/snowmobile 10 other than the phase-in and phase-out controls described below.

If at step 208 the ECU 164 determines that phase-out is occurring, then the ECU 164 continues at step 212 and controls the engine 24 (i.e. the fuel injectors 125A, 132A, the spark plug 134A . . . ) according to the phase-out control and then returns to step 202. In the phase-out control, the ECU 164 stops injecting fuel using the port fuel injector 125A and increases the quantity of fuel injected by the direct fuel injector 132A. The quantity of fuel injected by the direct fuel injector 132A is increased from the % DI of the primary fuel quantity determined at step 204 to 100% of the primary fuel quantity. The phase-out control will be described in greater detail below with respect to FIG. 10.

Returning to step 206, if the ECU 164 determines that the % PFI is greater than 0%, then at step 214 the ECU 164 determines if the port fuel injector 132A is being phased-in, meaning that it was previously not being used and should now be used. For example, if in the previous cycle the engine speed was 6000 RPM and the throttle position was 25%, the % PFI was 0%, and now the engine speed is 6000 RPM and the throttle position is 30%, the % PFI is 45%. Since the % PFI has changed from 0% to 45%, the port fuel injector 132A is being phased-in. If in two consecutive cycles the % PFI changes from 0% to a non-zero value, the ECU 164 determines that phase-in occurs. If in two consecutive cycles the % PFI does not change or changes from one non-zero value to another non-zero value, the ECU 164 determines that no phase-in occurs.

If at step 214 the ECU 164 determines that phase-in is not occurring, then the ECU 164 continues at step 210 and controls the engine 24 (i.e. the fuel injectors 125A, 132A, the spark plug 134A . . . ) according to the regular control and then returns to step 202.

If at step 214 the ECU 164 determines that phase-in is occurring, then the ECU 164 continues at step 216. At step 216, the ECU 164 increases a counter N by 1. Then at step 218, the ECU 164 determines if the value of the counter N has changed by more than or equal to a predetermined number of times X during a predetermined period of time "t". Alternatively, it is contemplated that at step 218, the ECU 164 could determine if the value of the counter N has changed by more than or equal to a predetermined number of times X during a predetermined period of cycles, one cycle corresponding to one full rotation of the crankshaft 100. The purpose of steps 216, 218 will be explained in more detail below.

If at step 218 the ECU 164 determines that the counter N has not changed by more than or equal to the predetermined number of times X during the predetermined period of time "t", then the ECU 164 continues at step 220 and controls the engine 24 (i.e. the fuel injectors 125A, 132A, the spark plug 134A . . . ) according to the phase-in control and then returns to step 202. In the phase-in control, the ECU 164 injects fuel using the port fuel injector 125A and the direct fuel injector 132A. The quantity of fuel injected by the direct fuel injector 132A is initially more than the % DI of the primary fuel quantity and is decreased to the % DI of the primary fuel quantity. The quantity of fuel injected by the port fuel injector 125A is initially increased to more than the % PFI of the primary fuel quantity. As such, during the phase-in control, the sum of the fuel quantities injected by the direct fuel injector 132A and the port fuel injector 125A is initially greater that the primary fuel quantity. The reason for this is that it has been found that when fuel is being injected by the port fuel injector 125A after a period of time where the port fuel injector 125A has not been used, a portion of the fuel injected by the port fuel injector 132A sticks to and coats the surfaces of the interior of the crankcase 102 and the surfaces of components housed therein. As such, not all of the fuel initially injected by the port fuel injector 125A makes it to the combustion chamber 120A. If only the % DI of the primary fuel quantity was initially injected by the direct fuel injector 132A and only the % PFI of the primary fuel quantity was initially injected by the port fuel injector 125A, then less than the primary fuel quantity determined at step 202 would be supplied in the combustion chamber 120A. Therefore, more than the % DI of the primary fuel quantity is initially injected by the direct fuel injector 132A and more than the % PFI of the primary fuel quantity is initially injected by the port fuel injector 125A to compensate for the fuel lost to the above-mentioned sticking and coating to ensure that a sufficient quantity of fuel is supplied to the combustion chamber 120A. Once the various surfaces are coated with fuel, it has been found that very little to no fuel is lost to the above-mentioned coating and sticking, as such the amount of fuel injected by the direct fuel injector 132 and port fuel injector 125A can be reduced. It is contemplated that the direct fuel injector 132A could initially inject only the % DI of the primary fuel quantity and that the port fuel injector 125A could inject more than the % PFI of the primary fuel quantity. It is also contemplated that the port fuel injector 125A could initially inject only the % PFI of the primary fuel quantity and that the direct fuel injector 132A could inject more than the % DI of the primary fuel quantity. The phase-in control will be described in greater detail below with respect to FIG. 7.

If at step 218 the ECU 164 determines that the counter N has changed by more than or equal to the predetermined number of times X during the predetermined period of time "t" (or number of cycles), then the ECU 164 goes to step 222. At step 222, the ECU 164 makes a record that the fuel quantities to be injected during the subsequent step 220 by one or both of the direct fuel injector 132A and the port fuel injector 125A during phase in control should be less than they would be had the method proceeded directly from step 218 to step 220. If at step 218 the ECU 164 determines that the counter N has changed by more than or equal to the predetermined number of times X during the predetermined period of time "t" (or number of cycles), this is an indication that the amount of time (or number of cycles) between subsequent uses of the phase-in control is small. As such, the above-mentioned fuel sticks to and coats the surfaces of the interior of the crankcase 102 and the surfaces of components housed therein did not have the time to evaporate and/or to be entrained by air to the combustion chamber 120A since the port fuel injector 125A has stopped injecting fuel. As such, injecting the same amount of fuel injected by the direct fuel injector 132A and the port fuel injector 125A during phase-in control as when no fuel coats these surfaces would result in too much fuel being supplied toward the combustion chamber 120A. Hence, step 222 reduces the quantity of fuel that will be injected at step 220 by one or both fuel injectors 125A, 132A. It is contemplated that steps 216, 218, 222 could be omitted. It is also contemplated that instead of or in addition to steps 216, 218, the ECU 164 could determine following step 214 and prior to step 220 if any other conditions is present that would result in too much fuel being supplied to the combustion chamber 120A during phase-in control. If such a condition is present, the ECU 164 would proceed to step 222 prior to proceeding to step 220.

Turning now to FIGS. 7 and 10, phase-in and phase-out controls will be described in more detail with respect to the exemplary graphs shown in FIGS. 7 and 10. For simplicity, the phase-in and phase-out controls will be described with respect to only the cylinder the 106A and its associated components. It should be understood that the phase-in and phase-out controls are also being carried out in the same manner with respect to the cylinder 106B and its associated components. The graph of FIG. 7 represents phase-in control for a % PFI that changes from 0% to 50%, for example when the engine speed is 5000 RPM and the throttle position changes from 25% to 30% (see FIG. 8A). The graph of FIG. 10 represents a phase-out control for a % PFI that changes from 50% to 0%, for example when the engine speed is 5000 RPM and the throttle position changes from 30% to 25% (see FIG. 8A). In both graphs, the quantity of fuel injected by the direct fuel injector 132A is represented by line 300 and the quantity of fuel injected by the port fuel injector 125A is represented by line 304.

With respect to FIG. 7, phase-in control begins at time t1. Before time t1, the port fuel injector 125A injects no fuel (i.e. % PFI equals 0%) and the direct fuel injector 132A injects the primary fuel quantity (i.e. % DI equals 100%). The phase-in control begins at t1 when the % DI and % PFI determined at step 204 described above are both 50% in the present example. However as can be seen, the quantities of fuel injected by the direct fuel injector 132A and the port fuel injector 125A are greater than 50%.

From time t1 to time t2, the fuel quantity injected by the direct fuel injector 132A is held constant at 100% of the primary fuel quantity. Then at t2, the fuel quantity injected by the direct fuel injector 132A is reduced to a value between 100% and the % DI determined at step 204 (i.e. 50% in the present example). In the present example, this value is 75%, but other values are contemplated. The fuel quantity injected by the direct fuel injector 132A is then held constant at 75% up to time t3. Starting at time t3, the fuel quantity injected by the direct fuel injector 132A is reduced linearly until it reaches 50% (i.e. the % DI of step 204), and is then held at this value until the % DI changes. The above manner in which the fuel quantity injected by the direct fuel injector 132A is reduced is only one of the various manners contemplated. For example, it is contemplated that the fuel quantity injected by the direct fuel injector 132A could decrease linearly or non-linearly from time t1 to time t4.

At time t1, the fuel quantity injected by the port fuel injector 125A is increased to inject a quantity of fuel corresponding to the % PFI of the primary fuel quantity combined with a pair of correction factors. It is contemplated that in other implementations, there could be more or less than two correction factors and that the correction factors could differ from the ones described below.

The first correction factor is a phase-in correction factor. The phase-in correction factor is a factor that is applied to initially increase the quantity of fuel injected by the port fuel injector 125A above the % PFI of the primary fuel quantity for the reasons discussed above and then decreases over time (or cycles). In the present implementation, the phase-in correction factor is initially the same regardless of operating conditions, but it is contemplated that it could vary based on operation conditions such as engine speed or throttle position. In the example shown in FIG. 7, the phase-in correction factor is initially 110%, is then reduced linearly to reach 100% at time t5 and is then constant. In the example shown, for a % PFI of 50%, it means that the quantity of fuel to be injected by the port fuel injector 125A resulting from the combination with the phase-in correction factor is initially 55% (i.e. 50%×110%) at time t1 and is reduced linearly to 50% (i.e. 50%×100%) at time t5. This is illustrated by line 302 in FIG. 7. It is contemplated that the phase-in correction could be reduced non-linearly or in steps.

The second correction factor is a fuel trapping efficiency correction factor. Fuel trapping efficiency is the ability to keep fuel freshly supplied in the combustion chamber 120A and preventing it from escaping to the exhaust system without being combusted. The direct fuel injector 132A has a higher fuel trapping efficiency than the port fuel injector 125A because the direct fuel injector 132 can inject fuel in the combustion chamber 120A later in the cycle when the exhaust ports 136A, 138A are closed or almost closed, so less fuel can escape. To compensate for the fuel supplied from the port fuel injector 125A that escapes through the exhaust ports 136A, 138A, the fuel trapping efficiency correction factor is applied to the quantity of fuel calculated above with the phase-in correction factor. In the present implementation, the ECU 164 obtains the fuel trapping efficiency correction factor using the PFI fuel trapping efficiency correction map 168 shown in FIG. 9. It should be understood that the map 168 shown in FIG. 9 is an exemplary map. Different engines and/or desired performance characteristics could require different maps. The map 168 provides the fuel trapping efficiency correction factor as a percentage for a given throttle position and engine speed. In the map 168, the throttle position is given as a percentage of opening of the throttle plate 126, with 0% being a minimum position of the throttle plate 126 and 100% being a wide-open throttle plate position. The ECU 164 determines the fuel trapping efficiency correction factor by retrieving from the map 168 the fuel trapping efficiency correction factor corresponding to the engine speed and throttle position used above at step 202. It is also contemplated that the fuel trapping efficiency correction factor could be determined using one or more algorithms. In the example illustrated, for an engine speed of 5000 RPM and a throttle position of 30%, the fuel trapping efficiency correction factor is 155% as can be seen from FIG. 9. This factor is then applied to the fuel quantity corresponding to line 302.

The ECU 164 determines the fuel quantity to be injected by the port fuel injector 125A by multiplying the % PFI of the primary fuel quantity by the phases in correction factor and by the fuel trapping efficiency correction factor. Therefore, in the present example, at time t1, the port fuel injector 125A initially injects a fuel quantity corresponding to 85,25% of the primary fuel quantity (i.e. 50%×110%×155%) and then reduces this quantity linearly to reach 77,50% (i.e. 50%×100%×155%) at time t5. This is illustrated by line 304 in FIG. 7. As can be seen by comparing lines 300 and 304 in FIG. 7, the quantity of fuel injected by the direct fuel injector 132A decreases faster than the quantity of fuel injected by the port fuel injector 125A.

With respect to FIG. 10, phase-out control begins at time t1. Before time t1, the port fuel injector 125A injects the fuel quantity corresponding to line 304 (i.e. % PFI of the primary fuel quantity with fuel trapping efficiency factor applied) and the direct fuel injector 132A injects the % DI of the primary fuel quantity, which in the present example is 50%. The phase-out control begins at t1 when the % DI and % PFI determined at step 204 described above are 0% and 100% respectively. Therefore, as can be seen, the ECU 164 stops injecting fuel with the port fuel injector 125A (line 304 is at 0%). However as can be seen, the quantity of fuel injected by the direct fuel injector 132A is not immediately raised to 100%. This is because even if the fuel injector 125A is stopped, some of the fuel that is present in the crankcase 102 and coats the various surfaces therein will continue to be supplied nonetheless. Therefore, the fuel quantity injected by the direct fuel injector 132A remains constant at the % DI (i.e. 50%) until time t2. At time t2, the fuel quantity injected by the direct fuel injector 132A is increased by a predetermined amount. From time t2, the fuel quantity injected by the direct fuel injector 132A is increased linearly until it reaches 100% of the primary fuel quantity at time t3. The fuel quantities injected by the direct fuel injector 132A and the port fuel injector 125A will then remain the same until there is a change in the operating conditions. It is contemplated that the fuel quantity injected by the direct fuel injector 132A could be increased differently than described above.

Figure 11:
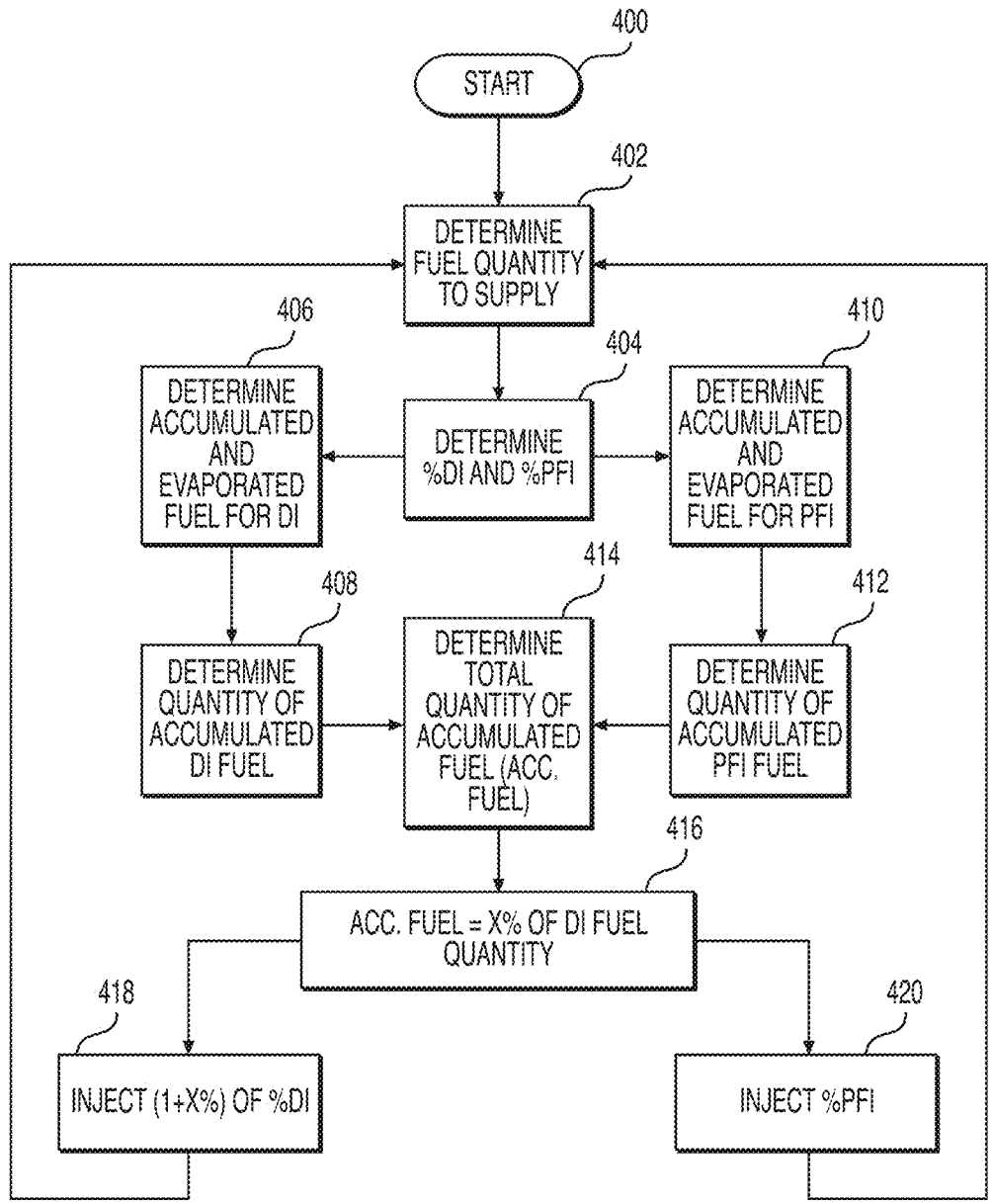
FIG. 11 is a logic diagram of an alternative method for controlling the engine of FIG. 2.
Figure 12:
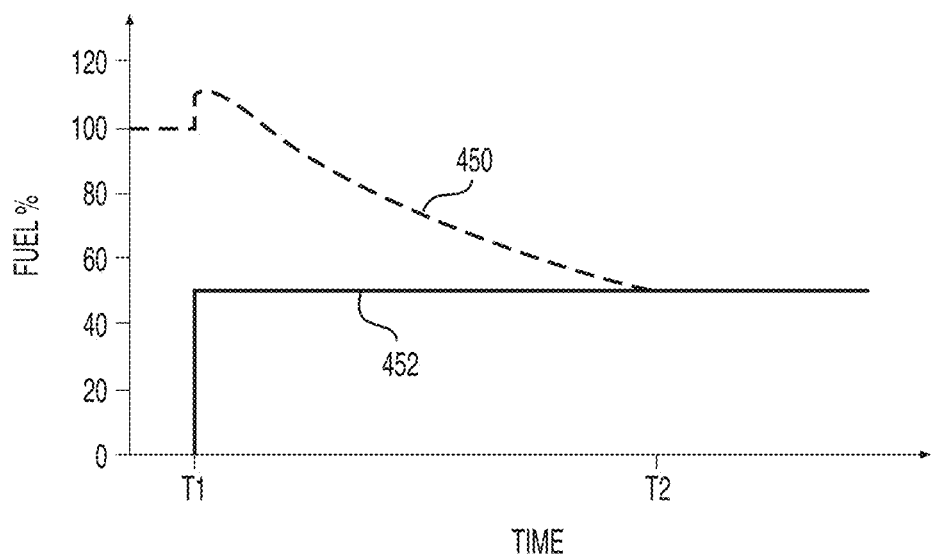
FIG. 12 is a graph illustrating a phase-in control according to the method of FIG. 11.
Figure 13:
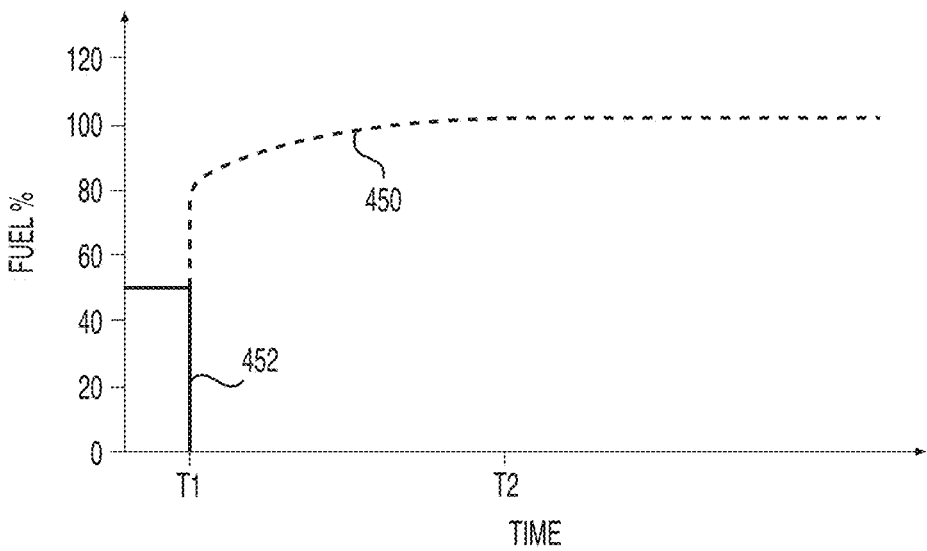
FIG. 13 is a graph illustrating a phase-out control according to the method of FIG. 11.

Turning now to FIGS. 11 to 13, an alternative method for controlling the engine 24 will be described. For simplicity, the method will be described with respect to only the cylinder 106A and its associated components. It should be understood that the method is also being carried out in the same manner with respect to the cylinder 106B and its associated components. It should also be noted that the time values t1 to t3 in FIGS. 12 and 13 are intended to merely indicate the sequence of events, that the spacing between subsequent time values is not necessarily representative of a relative amount of time between these events, that the values of t1 and t2 in FIG. 12 do not correspond to the values of t1 and t2 in FIGS. 7, 10 and 13, and that the values of t1 and t2 in FIG. 13 do not correspond to the values of t1 and t2 in FIGS. 7 and 10. The method begins at step 400.

Following step 400, the ECU 164 proceeds to step 402 where it determines the primary fuel quantity to be supplied to the combustion chamber 120A. From step 402, the ECU proceeds to step 404 where it determines the ratio of the primary fuel quantity that is to be injected by the direct fuel injector 132A (hereinafter the % DI) and the ratio of the primary fuel quantity that is to be injected by the port fuel injector 125A (hereinafter the % PFI). Steps 402 and 404 correspond to steps 202 and 204 described above respectively. As such, steps 402 and 404 will not be described herein in detail. It is contemplated that the manner in which the ECU 164 determines the primary fuel quantity at step 402 and the ratios at step 404 could differ from the manner described above with respect to step 202 and 204.

From step 404, the ECU 164 proceeds to perform steps 406 and 410 in parallel, and from step 406 and 410 the ECU 164 proceeds to perform steps 408 and 412 respectively in parallel. It is contemplated that steps 406, 408, 410 and 412 could be all be performed in series or that only some of steps 406, 408, 410 and 412 could be performed in series as long as step 406 is performed prior to step 408 and as long as step 410 is performed prior to step 412.

At step 406, the ECU 164 determines for the quantity of fuel to be injected by the direct fuel injector 132A (i.e. % DI) determined at step 404, how much of this fuel would stick to the surfaces in the engine 24 (i.e. accumulate) and how much of the already accumulated fuel would evaporate back in the air to be combusted. There are many known ways to make this determination. Some of these are based on the X-Tau model developed by Charles Aquino and described in the 1981 SAE paper entitled "Transient A/F Control Characteristics of the 5 Liter Central Fuel Injection Engine" (SAE 910494) and in U.S. Pat. No. 5,474,052, issued Dec. 12, 1995, the entirety of both of which is incorporated herein by reference. In the present implementation, the base quantity of fuel to be injected by the direct fuel injector 132A that accumulates on the surfaces is obtained from a map as a function of engine speed. A correction factor based on temperature is then applied to this base quantity. It is contemplated that the correction factor could be based on a factor other than temperature or on a combination of factors. In the present implementation, the base quantity of fuel that evaporates from the surfaces is obtained from a map as a function of engine speed. A correction factor based on temperature is then applied to this base quantity. It is contemplated that the correction factor could be based on a factor other than temperature or on a combination of factors. Then at step 408, the ECU 164 combines numbers obtained at step 406 to determine the net quantity of fuel that will accumulate by injecting the quantity % DI with the direct fuel injector 132A (i.e. the quantity of fuel that accumulates minus the quantity of fuel that evaporates).

Steps 410 and 412 correspond to step 406 and 408 respectively, but in steps 410, 412 the determination is made based on the quantity of fuel % PFI to be injected by the port fuel injector 125A. As such, steps 410 and 412 will not be described in detail herein. It should be noted that the amount of fuel accumulating from the direct injector 132A is typically less than the amount of fuel accumulating from the port fuel injector 125A.

Following steps 406 and 412, at step 414 the ECU 164 combines the quantities of accumulated fuel determined at steps 408 and 412, thereby determining the total quantity of fuel that are expected to accumulate on the surfaces of the engine 24 should the quantities of fuel determined at step 404 be injected by the direct fuel injector 132A and the port fuel injector 125A. This total quantity of fuel represents the quantity of fuel which needs to be compensated during the actual fuel injections in order to obtain the desired air/fuel ratio based on the quantity of fuel determined at step 402. If at step 414, there is a net accumulation of fuel on the surfaces of the engine 24 (i.e. more fuel accumulates than evaporates), then the total quantity of fuel to be injected has to be more than the quantity of fuel determined at step 402 in order to maintain the air/fuel ratio. If at step 414, there is a net evaporation of fuel from the surfaces of the engine 24 (i.e. more fuel evaporates than accumulates), the quantity determined at step 414 has a negative valued, and the total quantity of fuel to be injected has to be less than the quantity of fuel determined at step 402 in order to maintain the air/fuel ratio.

As will be understood from the following steps, in the present method, the compensation for the quantity of fuel determined at step 414 is entirely handled by adjusting the quantity of fuel to be injected by the direct fuel injector 132A. The port fuel injector 125A is not used to compensate for the quantity of fuel determined at step 414. It is contemplated that in an alternative implementation the compensation for the quantity of fuel determined at step 414 could be entirely handled by adjusting the quantity of fuel to be injected by the port fuel injector 125A and that the direct fuel injector 132A could not be used for this compensation. It is also contemplated that in another alternative implementation the compensation for the quantity of fuel determined at step 414 could be handled by adjusting the quantities of fuel to be injected by both the direct fuel injector 132A and the port fuel injector 125A.

From step 414, the ECU 164 proceeds to step 416 where it determines what percentage X of the quantity of fuel to be injected by the direct fuel injector 132A determined at step 404 (i.e. % DI) the quantity of accumulated fuel determined at step 414 represents. For example, if at step 402 the total fuel quantity is 10 mg and at step 404 the ratio of fuel to be injected by the direct fuel injector 132A is 50%, then the quantity of fuel to be injected by the direct fuel injector 132A determined at step 404 is 5 mg (i.e. 50% of 10 mg). Then, if at step 414 the total quantity of accumulated fuel is 6 mg, then the percentage X at step 416 is 120% (i.e. 6÷5×100=120%).

Then from step 416, the ECU 164 proceeds to steps 418 and 420 which it performs in parallel. At step 418, the ECU 164 first calculates the actual quantity of fuel to be injected by the direct fuel injector 132A and then causes the direct fuel injector 132A to inject this quantity of fuel. The actual quantity of fuel to be injected by the direct fuel injector 132A is the quantity of fuel determined for the direct fuel injector 132A at step 404 (% DI) plus the amount of fuel to be compensated because of fuel accumulation (Acc. Fuel, step 414, which has a negatively value if there is a net evaporation). As such for the example provided above where the quantity of fuel to be injected by the direct fuel injector 132A determined at step 404 is 5 mg, the total quantity of accumulated fuel is 6 mg at step 414, and the percentage X is 120% at step 416, then the direct fuel injector 132A needs to inject 11 mg of fuel (i.e. (1+1.2)×5 mg=11 mg). As such, the direct fuel injector 132A needs to inject 110% of the quantity of fuel calculated at step 402. At step 420, the ECU 164 causes the port fuel injector 125A to inject the quantity of fuel determined for the port fuel injector 125A at step 404. So for the above example, this is 5 mg of fuel to be injected by the port fuel injector 125A (i.e. 50% of 10 mg). Therefore, for the above example, the actual total quantity of fuel to be injected is 16 mg (i.e. 11 mg from DI+5 mg from PFI, or 10 mg initially determined at step 402+6 mg to compensate for the accumulated fuel from step 414), or 160% of the quantity initially determined at step 402 (i.e. 16÷10× 100=160%). As a result, of the 16 mg of fuel injected by the two fuel injectors 125A, 132A, 6 mg accumulate on the surfaces of the engine 24, and 10 mg get mixed with the air in the combustion chamber 120A, which corresponds to the quantity of fuel calculated at step 402 and therefore the desired air/fuel ratio is achieved. It should be understood that the above calculations are for a given time and that the quantities will vary over time. It is contemplated that step 418 and 420 could be performed in series. In such a case, step 420 would be performed first in most cases as the fuel injected by the port fuel injector 125A takes some time to reach the combustion chamber 120A, whereas the fuel injected by the direct fuel injector 132A is injected directly in the combustion chamber 120A.

From steps 418 and 420, the ECU 164 returns to step 402 and the method is repeated.

Turning now to FIGS. 12 and 13, phase-in and phase-out controls with respect to the method of FIG. 11 described above will be described in more detail with respect to the exemplary graphs shown in FIGS. 12 and 13. For simplicity, the phase-in and phase-out controls will be described with respect to only the cylinder 106A and its associated components. It should be understood that the phase-in and phase-out controls are also being carried out in the same manner with respect to the cylinder 106B and its associated components. The graph of FIG. 12 represents phase-in control for a % PFI that changes from 0% to 50%. The graph of FIG. 13 represents a phase-out control for a % PFI that changes from 50% to 0%. In both graphs, the quantity of fuel injected by the direct fuel injector 132A is represented by the dotted line 450 and the quantity of fuel injected by the port fuel injector 125A is represented by the solid line 452.

With respect to FIG. 12, phase-in control begins at time t1. Before time t1, the port fuel injector 125A injects no fuel (i.e. % PFI equals 0%) and the direct fuel injector 132A injects the primary fuel quantity (i.e. % DI equals 100%). The phase-in control begins at t1 when the % DI and % PFI determined at step 404 described above are both 50% in the present example. However as can be seen, the quantity of fuel injected by the direct fuel injector 132A is greater than the 50% of step 404. Using the same example that was used above with respect to the description of the method of FIG. 10, where the quantity of fuel to be injected by the direct fuel injector 132A determined at step 404 is 5 mg, the total quantity of accumulated fuel is 6 mg at step 414, and the percentage X is 120% at step 416, then the direct fuel injector 132A needs to inject 11 mg of fuel (i.e. (1+1.2)×5 mg=11 mg). As such, the direct fuel injector 132A needs to initially inject 110% of the value determined at step 402 as shown at t1 (i.e. value determined at step 418). Over time, this quantity gradually goes down as can be seen until time t2 where the direct fuel injector 132A injects 50% of the value determined at step 402 (i.e. the value of step 404). This is because as time goes by, the surfaces of the engine 24 get saturated with fuel and a balance between accumulation and evaporation is reached (i.e. the quantity at step 414 is zero). At time t1, the port fuel injector 125A injects 50% of the value determined at step 402 (i.e. the quantity determined at step 404) and this quantity remains constant. Following time t2, the ratios of fuel injected by the direct and port fuel injectors 132A, 125A remain the same until the ECU 164 determines at step 404 that they should change.

With respect to FIG. 13, phase-out control begins at time t1. In the present example, before time t1, the port fuel injector 125A and the direct fuel injector 132A each injects 50% of the quantity of fuel determined at step 402. The phase-out control begins at t1 when the % DI and % PFI determined at step 404 described above change to 100% and 0% respectively. Therefore, as can be seen, the ECU 164 stops injecting fuel with the port fuel injector 125A (line 452 is at 0%). However as can be seen, the quantity of fuel injected by the direct fuel injector 132A is not immediately raised to 100%. This is because even if the port fuel injector 125A is stopped, some of the fuel that is present in the crankcase 102 and coats the various surfaces therein continues to evaporate and therefore continues to be supplied to the combustion chamber 120A nonetheless. Therefore, the quantity of accumulated fuel at step 414 is negative, which means that at step 418, less than 100% of the quantity determined as step 404 is to be injected. For example, for the example where the quantity of fuel at step 402 is 10 mg and the quantity determined at step 414 is −2 mg (i.e. net evaporation of 2 mg), then at step 418, the direct fuel injector injects 8 mg or 80% of the quantity of step 402, not 100%. From time t1, as the fuel that coats the various surfaces dry up, less fuel evaporates, and the quantity of fuel injected by the direct fuel injector 132A is increased gradually until it reaches 100% of the primary fuel quantity at time t2. The fuel quantities injected by the direct fuel injector 132A and the port fuel injector 125A will then remain the same until there is a change in the operating conditions.

In the above-described methods there may be operating conditions where the determined quantity of fuel to be injected by the direct fuel injectors 132A, 132B exceeds the maximum quantity of fuel that the direct fuel injectors 132A, 132B are capable of injecting. It is contemplated that under such conditions, the direct fuel injectors 132A, 132B inject the maximum quantity of fuel that they are capable of injecting. The difference between the determined quantity of fuel to be injected by the direct fuel injectors 132A, 132B and the maximum quantity of fuel that the direct fuel injectors 132A, 132B are capable of injecting is added to the quantity of fuel to be injected by the corresponding port fuel injectors 125A, 125B such that the total quantity of fuel injected still corresponds to the total quantity of fuel to be injected that has been determined by the methods.

Similarly, in the above-described methods there may be operating conditions where the determined quantity of fuel to be injected by the port fuel injectors 125A, 125B exceeds the maximum quantity of fuel that the port fuel injectors 125A, 125B are capable of injecting. It is contemplated that under such conditions, the port fuel injectors 125A, 125B inject the maximum quantity of fuel that they are capable of injecting. The difference between the determined quantity of fuel to be injected by the port fuel injectors 125A, 125B and the maximum quantity of fuel that the port fuel injectors 125A, 125B are capable of injecting is added to the quantity of fuel to be injected by the corresponding direct fuel injectors 132A, 132B such that the total quantity of fuel injected still corresponds to the total quantity of fuel to be injected that has been determined by the methods.

Also, in some implementations, the direct fuel injectors 132A, 132B and the port fuel injectors 125A, 125B have a minimum quantity of fuel that they can inject with precision. Below this minimum quantity, it cannot be precisely determined the quantity of fuel actually being injected. As such, in some implementations, should the above described methods determine that the quantity of fuel to be injected by the direct fuel injectors 132A, 132B or the port fuel injectors 125A, 125B is less than their corresponding minimum quantity, the minimum quantity will be injected. As a result, the total quantity of fuel injected will be slightly higher than the total quantity of fuel to be injected that has been determined by the methods. Alternatively, the quantity of fuel injected by the fuel injectors 132A, 132B or 125A, 125B that are not injecting their minimum quantity of fuel can be reduced slightly to compensate for the extra quantity of fuel being injected by the fuel injectors 132A, 132B or 125A, 125B that are injecting their minimum quantity of fuel.

In the above-described methods, in some implementations, should one of the direct fuel injector 132A and the port fuel injector 125A become defective, the operating conditions of the engine 24 will be limited to operating conditions where the total quantity of fuel to be injected can be completely supplied by the non-defective injector 132A, 125A. The same thing occurs should one of the direct fuel injector 132B and the port fuel injector 125B become defective. In one implementation, should one of the injectors 125A, 125B, 132A, 132B become defective, the operating conditions of the engine 24 are limited to forty percent of the maximum engine power, the exhaust valves 142A, 142B are limited to an intermediate position (i.e. they will not fully open) and a "check engine" light (not shown) or some other visual indicator is turned on to indicate to the user that something is wrong with the engine 24.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for controlling a two-stroke internal combustion engine, the engine having at least one combustion chamber, at least one direct fuel injector for injecting fuel directly in the at least one combustion chamber, at least one port fuel injector for injecting fuel upstream of the at least one combustion chamber, and at least one exhaust valve movable between at least a fully lowered position and a fully opened position, the method comprising:
supplying a first fuel quantity to the at least one combustion chamber, a first ratio of the first fuel quantity being supplied by the at least one port fuel injector, the first ratio being greater than or equal to zero; and
supplying a second fuel quantity to the at least one combustion chamber when a position of the at least one exhaust valve changes, a second ratio of the second fuel quantity being supplied by the at least one port fuel injector, the second ratio being greater than or equal to zero, and the second ratio being different from the first ratio.

2. The method of claim 1, wherein when the position of the at least one exhaust valve changes to increase an opening of the at least one exhaust valve, the second ratio is greater than the first ratio.

3. The method of claim 1, wherein when the position of the at least one exhaust valve changes to increase an opening of the at least one exhaust valve, the second ratio is smaller than the first ratio.

4. The method of claim 1, wherein:
at a first engine speed, for an increase of throttle position from a first throttle position to a second throttle position, with the at least one exhaust valve opening from a first exhaust valve position to a second exhaust valve position, the second ratio is greater than the first ratio;
at a second engine speed, for an increase of throttle position from a third throttle position to a fourth throttle position, with the at least one exhaust valve opening from a third exhaust valve position to a fourth exhaust valve position, the second ratio is smaller than the first ratio; and
a difference in opening between the second and first throttle valve positions is equal to a difference in opening between the fourth and third throttle valve position.

5. The method of claim 4, wherein the second engine speed is greater than the first engine speed.

6. The method of claim 5, wherein the third throttle valve position is a more open throttle valve position than the second throttle valve position.

7. The method of claim 4, wherein the first exhaust valve position is a fully lowered position, the second exhaust valve position is a first intermediate position, the third exhaust valve position is a second intermediate position, and the fourth exhaust valve position is a fully opened position.

8. The method of claim 1, wherein when the position of the at least one exhaust valve changes from a fully lowered position to another exhaust valve position, the second ratio is greater than the first ratio.

9. The method of claim 8, wherein when the position of the at least one exhaust valve changes from an intermediate position to a fully opened position, the second ratio is smaller than the first ratio.

10. The method of claim 1, wherein:
the second fuel quantity is supplied when the position of the at least one exhaust valve changes from a fully lowered position to a first intermediate position;
the second ratio is greater than the first ratio;
the method further comprises supplying a third fuel quantity to the at least one combustion chamber when the position of the at least one exhaust valve changes from a second intermediate position to a fully open, a third ratio of the third fuel quantity being supplied by the at least one port fuel injector, the third ratio being greater than the first ratio and smaller than the second ratio.

* * * * *